United States Patent
Isogai et al.

(10) Patent No.: US 8,089,830 B2
(45) Date of Patent: Jan. 3, 2012

(54) NEAR-FIELD LIGHT GENERATING DEVICE INCLUDING NEAR-FIELD LIGHT GENERATING ELEMENT WITH EDGE PART OPPOSED TO WAVEGUIDE

(75) Inventors: Makoto Isogai, Tokyo (JP); Susumu Aoki, Tokyo (JP); Daisuke Miyauchi, Tokyo (JP); Eiji Komura, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 289 days.

(21) Appl. No.: 12/453,508

(22) Filed: May 13, 2009

(65) Prior Publication Data

US 2010/0290323 A1 Nov. 18, 2010

(51) Int. Cl.
*G11B 11/00* (2006.01)
*G11B 5/02* (2006.01)
*G11B 5/48* (2006.01)
*C23C 16/06* (2006.01)

(52) U.S. Cl. ............ 369/13.33; 369/13.13; 360/59

(58) Field of Classification Search ......... 369/13.13, 369/13.32, 112.27, 13.24; 356/601, 445
See application file for complete search history.

(56) References Cited

U.S. PATENT DOCUMENTS

| 6,649,894 B2 | 11/2003 | Matsumoto et al. |
| 6,768,556 B1 | 7/2004 | Matsumoto et al. |
| 7,330,404 B2 | 2/2008 | Peng et al. |
| 2007/0155188 A1 | 7/2007 | Kamijima |

FOREIGN PATENT DOCUMENTS

| JP | A-06-265869 | 9/1994 |
| JP | A-2001-255254 | 9/2001 |
| JP | A-2003-114184 | 4/2003 |
| JP | A-2005-116155 | 4/2005 |
| JP | A-2007-279373 | 10/2007 |

OTHER PUBLICATIONS

U.S. Appl. No. 12/814,669, filed Jun. 14, 2010.

*Primary Examiner* — Hoa T Nguyen
*Assistant Examiner* — Andrew Sasinowski
(74) *Attorney, Agent, or Firm* — Oliff & Berridge, PLC

(57) ABSTRACT

A near-field light generating device includes: a waveguide having a groove that opens in the top surface; a clad layer disposed on the top surface of the waveguide and having an opening that is contiguous to the groove; a near-field light generating element accommodated in the opening; and a buffer layer interposed between the near-field light generating element and each of the waveguide and the clad layer in the groove and the opening. The near-field light generating element includes: first and second side surfaces that decrease in distance from each other toward the groove; an edge part that connects the first and second side surfaces to each other and is opposed to the groove with the buffer layer therebetween; and a near-field light generating part that lies at one end of the edge part and generates near-field light.

10 Claims, 15 Drawing Sheets

NEAR-FIELD LIGHT GENERATING DEVICE INCLUDING NEAR-FIELD LIGHT GENERATING ELEMENT WITH EDGE PART OPPOSED TO WAVEGUIDE

BACKGROUND OF THE INVENTION

1. Field of the Invention

The present invention relates to a near-field light generating device for use in heat-assisted magnetic recording where a magnetic recording medium is irradiated with near-field light to lower the coercivity of the magnetic recording medium for data recording, and a method of manufacturing the same, and to a heat-assisted magnetic recording head, a head gimbal assembly, and a magnetic recording device each of which includes the near-field light generating device.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) intended for reading and a recording head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a method so-called heat-assisted magnetic recording. This method uses a recording medium having high coercivity. When recording data, a magnetic field and heat are simultaneously applied to the area of the recording medium where to record data, so that the area rises in temperature and drops in coercivity for data recording. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light. U.S. Pat. No. 6,649,894 and U.S. Pat. No. 6,768,556 each disclose a method of exciting plasmons by directly irradiating the plasmon antenna with light.

However, a plasmon antenna that is directly irradiated with light to generate near-field light is known to exhibit very low efficiency of conversion of the applied light into near-field light. The energy of the light applied to the plasmon antenna is mostly reflected off the surface of the plasmon antenna, or converted into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the reproducing head located in the medium facing surface to get farther from the magnetic recording medium, thereby causing the problem that a servo signal cannot be read during recording operations.

To cope with this, as described in, for example, U.S. Pat. No. 7,330,404, there has been proposed a technique in which light propagating through a waveguide is not directly applied to a plasmon antenna but is coupled with a near-field light generating element via a buffer part in a surface plasmon polariton mode to thereby excite surface plasmons on the near-field light generating element. The near-field light generating element has a near-field light generating part which is a sharp-pointed part located in the medium facing surface to generate near-field light. According to this technique, the light propagating through the waveguide is totally reflected at the interface between the waveguide and the buffer part to generate evanescent light permeating into the buffer part. The evanescent light and collective oscillations of charges on the near-field light generating element, i.e., surface plasmons, are coupled with each other to excite the surface plasmons on the near-field light generating element. In the near-field light generating element, the excited surface plasmons propagate to the near-field light generating part, and near-field light occurs from the near-field light generating part. According to this technique, since the near-field light generating element is not directly irradiated with the light propagating through the waveguide, it is possible to prevent an excessive increase in temperature of the near-field light generating element.

Now, a description will be given of the shape of the near-field light generating element and an example of arrangement of the near-field light generating element, the buffer part and the waveguide. In this example, the near-field light generating element is disposed above the top surface of the waveguide with the buffer part therebetween. The near-field light generating element has an edge part that is opposed to the waveguide with the buffer part therebetween. Typically, as viewed in a cross section parallel to the medium facing surface, the near-field light generating element is in the shape of an isosceles triangle with its vertex downward. An end of the edge part of the near-field light generating element is located in the medium facing surface. In this near-field light generating element, the end of the edge part located in the medium facing surface and its vicinity function as the near-field light generating part. In this example, surface plasmons are excited on the edge part of the near-field light generating element. The surface plasmons propagate along the edge part to reach the near-field light generating part, and the near-field light generating part generates near-field light based on the surface plasmons. According to this example, it is possible to achieve efficient propagation of the surface plasmons excited on the edge part of the near-field light generating element to the near-field light generating part.

In the foregoing near-field light generating element, the edge part is ideally formed into a linear shape by two side surfaces making contact with each other and forming a predetermined angle therebetween. In an actually fabricated near-field light generating element, however, the edge part is rounded and thereby has a cylindrical surface configuration that connects two side surfaces forming a predetermined angle therebetween. Here, the radius of curvature of the edge part having the cylindrical surface configuration will be referred to as point radius. The angle formed between the two side surfaces that are connected through the edge part will be referred to as point angle. As will be described below, the point radius and the point angle of the near-field light generating element used in a heat-assisted magnetic recording head are significant parameters that affect the characteristics of the heat-assisted magnetic recording head.

First, the point radius will be described. The point radius is a parameter that affects the spot diameter of the near-field light occurring from the near-field light generating part. In order to increase the recording density of a magnetic recording device, a smaller spot diameter is preferred for the near-field light. To reduce the spot diameter of the near-field light, a smaller point radius is preferred.

Next, the point angle will be described. To increase the use efficiency of the light propagating through the waveguide, it is important to increase the intensity of the surface plasmons to be excited on the near-field light generating element. This requires that the wave number of the evanescent light and the wave number of the surface plasmons excited on the near-field light generating element be matched with each other. The wave number of the surface plasmons excited on the near-field light generating element varies according to the shape of the near-field light generating element, or the shape of the edge part of the near-field light generating element in particular. The point angle is thus a parameter that affects the wave number of the surface plasmons excited on the near-field light generating element. Meanwhile, the wave number of the evanescent light depends on the wavelength of the light propagating through the waveguide. When typical laser light is used as the light to propagate through the waveguide, it is necessary that the wave number of the surface plasmons to be excited on the near-field light generating element be matched with the wave number of the evanescent light that is determined depending on the wavelength of the laser light. This means that there is a preferred range for the point angle.

As seen above, for the near-field light generating element having the edge part that is opposed to the waveguide with the buffer part therebetween, it is required that the point angle fall within the preferred range so as to increase the use efficiency of the light propagating through the waveguide and that the point radius be reduced so as to reduce the spot diameter of the near-field light. In actually fabricating the near-field light generating element, however, there is a problem that the point radius is difficult to reduce particularly when the point angle is somewhat large.

OBJECT AND SUMMARY OF THE INVENTION

It is an object of the present invention to provide a near-field light generating device that includes a near-field light generating element having an edge part opposed to a waveguide and that can increase the use efficiency of light propagating through the waveguide and reduce the spot diameter of near-field light, a method of manufacturing the same, and a heat-assisted magnetic recording head, a head gimbal assembly and a magnetic recording device each of which includes the near-field light generating device.

A near-field light generating device according to the present invention includes a waveguide, a clad layer, a near-field light generating element, and a buffer layer. The waveguide allows light to propagate therethrough and has a top surface and a groove, the groove opening in the top surface and being long in a first direction parallel to the top surface. The clad layer has a bottom surface in contact with the top surface of the waveguide, a top surface opposite to the bottom surface, and an opening that penetrates from the top surface to the bottom surface and is contiguous to the groove. The near-field light generating element is long in the first direction and is accommodated in the opening at least in part. The buffer layer is interposed between the near-field light generating element and each of the waveguide and the clad layer in the groove and the opening. Each of the clad layer and the buffer layer has a refractive index lower than that of the waveguide. The opening has a first opening sidewall and a second opening sidewall that decrease in distance from each other toward the top surface of the waveguide. The groove has a first groove sidewall that is contiguous to the first opening sidewall, and a second groove sidewall that is contiguous to the second opening sidewall. An angle that the first groove sidewall forms with respect to a second direction perpendicular to the top surface of the waveguide is smaller than an angle that the first opening sidewall forms with respect to the second direction. An angle that the second groove sidewall forms with respect to the second direction is smaller than an angle that the second opening sidewall forms with respect to the second direction. The near-field light generating element includes: a first side surface and a second side surface that are respectively opposed to the first and second opening sidewalls with the buffer layer therebetween, and decrease in distance from each other toward the groove; an edge part that connects the first and second side surfaces to each other and is opposed to the groove with the buffer layer therebetween; and a near-field light generating part that lies at one end of the edge part and generates near-field light. A surface plasmon is excited on the edge part through coupling with evanescent light that occurs from an interface between the waveguide and the buffer layer. The surface plasmon propagates along the edge part to the near-field light generating part. The near-field light generating part generates near-field light based on the surface plasmon.

In the near-field light generating device according to the present invention, the near-field light generating element may be made of one element selected from the group consisting of Pd, Pt, Rh, Ir, Ru, Au, Ag, Cu and Al, or an alloy composed of a plurality of elements selected from this group.

A method of manufacturing the near-field light generating device according to the present invention includes the steps of forming the waveguide and the clad layer; forming the buffer layer in the groove of the waveguide and the opening of the clad layer so that the waveguide, the clad layer and the buffer layer constitute a frame for forming the near-field light generating element; and forming the near-field light generating element in the frame.

In the method of manufacturing the near-field light generating device according to the present invention, the step of forming the waveguide and the clad layer may include the steps of: forming a preliminary waveguide that is intended to make the waveguide by undergoing formation of the groove therein afterward; forming the clad layer on the preliminary waveguide; and completing the waveguide by forming the groove in the preliminary waveguide by etching the preliminary waveguide with the clad layer used as an etching mask.

Here, in the step of completing the waveguide, the preliminary waveguide may be etched under a condition that etching selectivity is higher than 1.

In the method of manufacturing the near-field light generating device according to the present invention, the buffer layer may be formed by atomic layer deposition.

A heat-assisted magnetic recording head according to the present invention includes: a medium facing surface that faces a magnetic recording medium; a magnetic pole that has an end face located in the medium facing surface and produces a recording magnetic field for recording data on the magnetic recording medium; and the near-field light generating device according to the present invention. The near-field light generating part is located in the medium facing surface. The near-field light generating device generates near-field light that is to be applied to the magnetic recording medium when data is recorded on the magnetic recording medium using the recording magnetic field.

In the heat-assisted magnetic recording head according to the present invention, the near-field light generating element may be made of one element selected from the group consisting of Pd, Pt, Rh, Ir, Ru, Au, Ag, Cu and Al, or an alloy composed of a plurality of elements selected from this group.

A head gimbal assembly according to the present invention includes: the heat-assisted magnetic recording head according to the present invention; and a suspension that supports the heat-assisted magnetic recording head. A magnetic recording device according to the present invention includes: a magnetic recording medium; the heat-assisted magnetic recording head according to the present invention; and a positioning device that supports the heat-assisted magnetic recording head and positions the same with respect to the magnetic recording medium.

In the near-field light generating device, the heat-assisted magnetic recording head, the head gimbal assembly or the magnetic recording device according to the present invention, the waveguide has the groove and the clad layer has the opening that is contiguous to the groove. The angle that the first groove sidewall forms with respect to the second direction perpendicular to the top surface of the waveguide is smaller than the angle that the first opening sidewall forms with respect to the second direction. The angle that the second groove sidewall forms with respect to the second direction is smaller than the angle that the second opening sidewall forms with respect to the second direction. The near-field light generating element includes: the first and second side surfaces that are respectively opposed to the first and second opening sidewalls with the buffer layer therebetween, and decrease in distance from each other toward the groove; the edge part that connects the first and second side surfaces to each other and is opposed to the groove with the buffer layer therebetween; and the near-field light generating part that lies at one end of the edge part and generates near-field light. By virtue of such a configuration, the present invention makes it possible to achieve a near-field light generating element that has an edge part having a desired point angle and a small point radius. Consequently, according to the present invention, it is possible to increase the use efficiency of the light propagating through the waveguide and to reduce the spot diameter of the near-field light.

In the method of manufacturing the near-field light generating device according to the present invention, the buffer layer is formed in the groove of the waveguide and the opening of the clad layer so that the waveguide, the clad layer and the buffer layer constitute a frame for forming the near-field light generating element. The near-field light generating element is then formed in the frame. Such a manufacturing method makes it possible to form a near-field light generating element having a desired point angle and a small point radius. Consequently, according to the present invention, it is possible to increase the use efficiency of the light propagating through the wave guide and to reduce the spot diameter of the near-field light.

In the method of manufacturing the near-field light generating device according to the present invention, the step of forming the waveguide and the clad layer may include the steps of: forming a preliminary waveguide that is intended to make the waveguide by undergoing formation of the groove therein afterward; forming the clad layer on the preliminary waveguide; and completing the waveguide by forming the groove in the preliminary waveguide by etching the preliminary waveguide with the clad layer used as an etching mask. This allows precise alignment between the groove and the opening, and thus makes it possible to form the near-field light generating element with high precision.

Other and further objects, features and advantages of the present invention will appear more fully from the following description.

DETAILED DESCRIPTION OF THE PREFERRED EMBODIMENT

Figure 8:
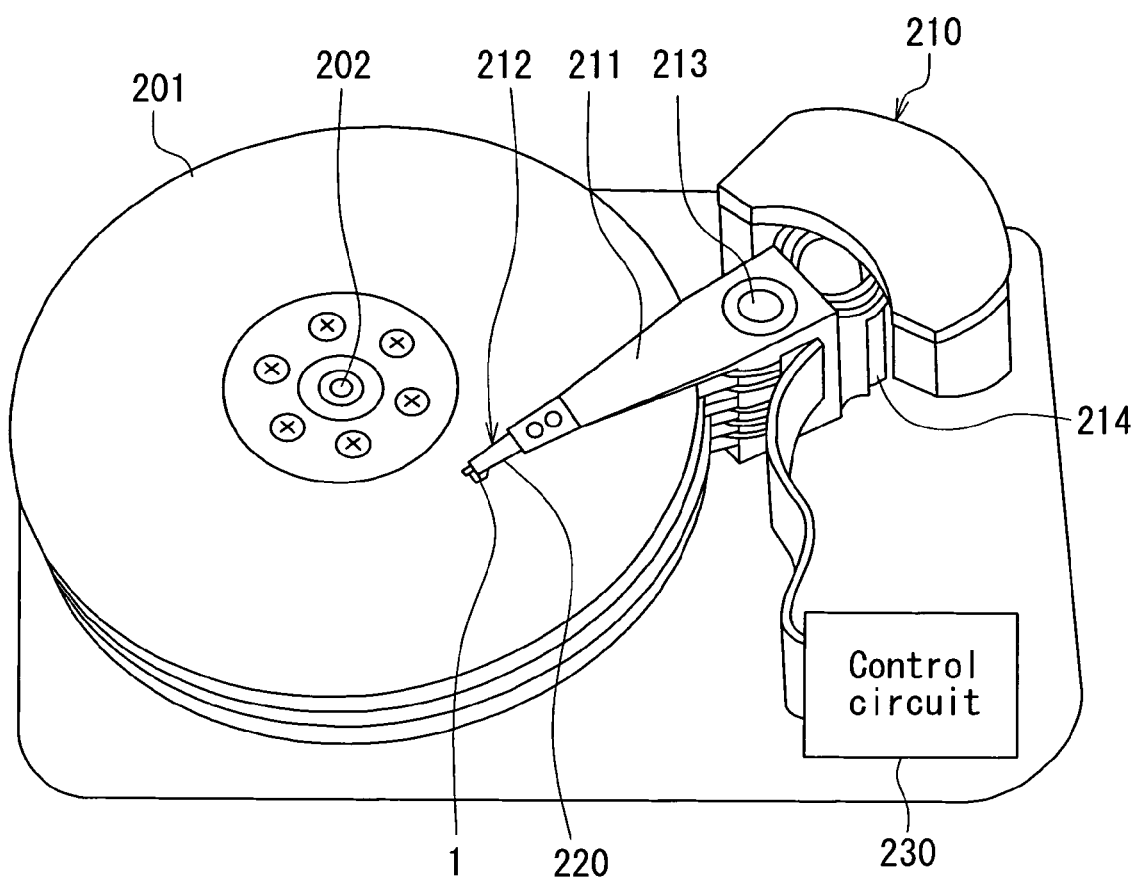
FIG. 8 is a perspective view of a magnetic recording device according to the embodiment of the invention.

A preferred embodiment of the present invention will now be described in detail with reference to the drawings. Reference is first made to FIG. 8 to describe a magnetic disk drive as a magnetic recording device according to the embodiment of the invention. As shown in FIG. 8, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device according to the present invention is not structurally limited to the magnetic disk drive having the above-described configuration. For example, the magnetic recording device according to the present invention may be provided with a single magnetic disk 201, a single driving arm 211, a single head gimbal assembly 212 and a single heat-assisted magnetic recording head 1.

The magnetic disk drive further includes a control circuit 230 for controlling the recording and reproducing operations of each heat-assisted magnetic recording head 1 and also for controlling the light emitting operation of a laser diode serving as a light source for generating laser light for heat-assisted magnetic recording described later.

Figure 9:
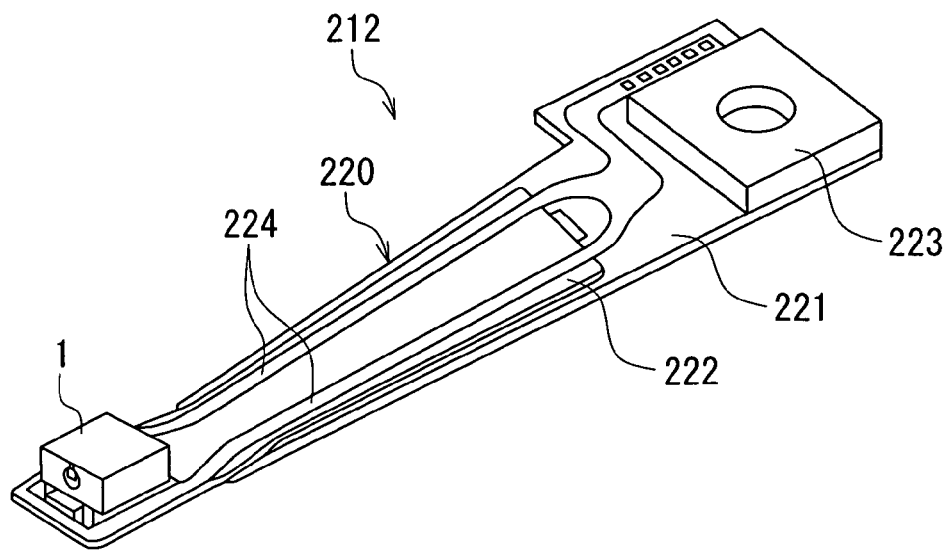
FIG. 9 is a perspective view of a head gimbal assembly according to the embodiment of the invention.

FIG. 9 is a perspective view of the head gimbal assembly 212 of FIG. 8. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged on the base part of the load beam 221.

The assembly carriage device 210 and the suspension 220 correspond to the positioning device according to the present invention. The head gimbal assembly according to the present invention is not limited to the one having the configuration shown in FIG. 9. For example, the head gimbal assembly according to the present invention may have an IC chip for driving the head that is mounted somewhere along the suspension 220.

Figure 10:
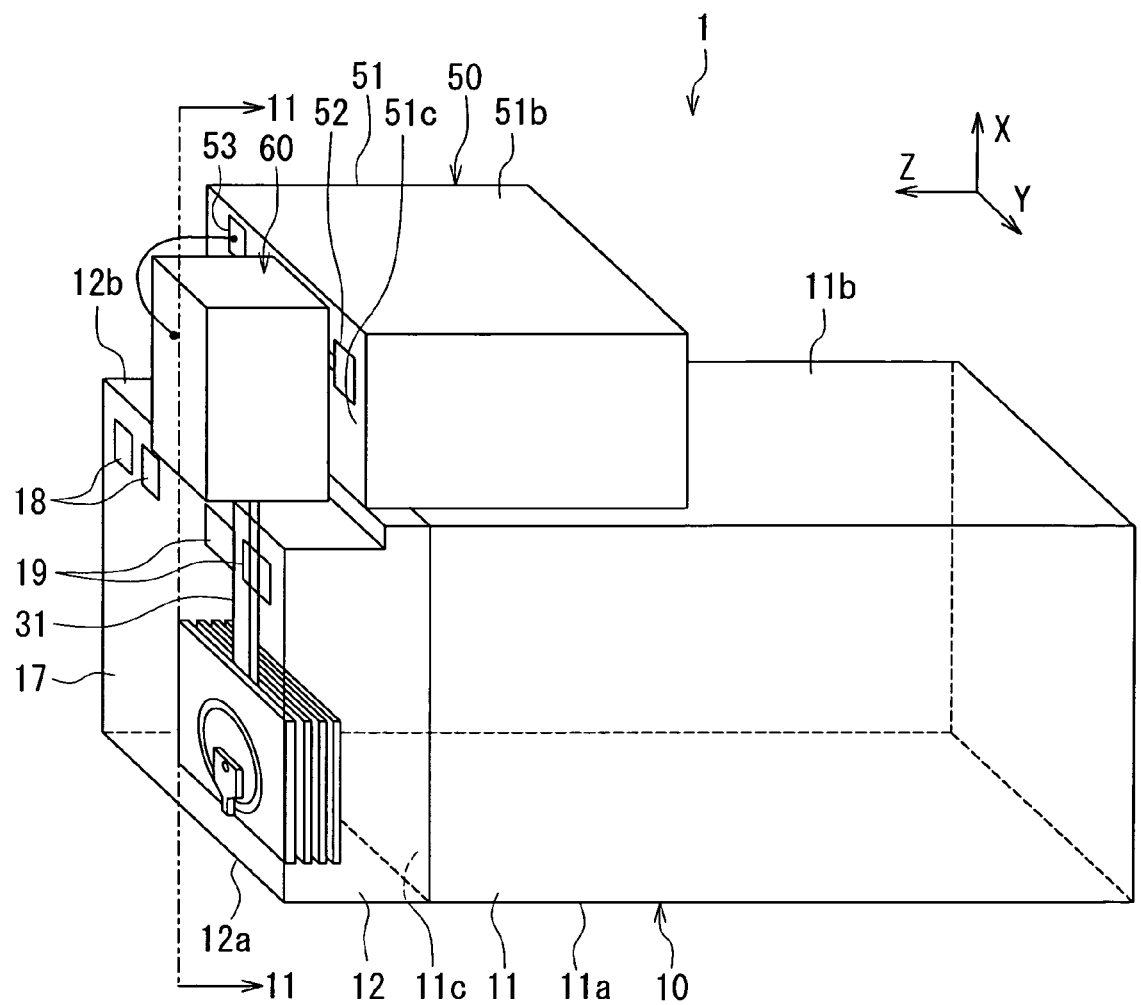
FIG. 10 is a perspective view of the heat-assisted magnetic recording head according to the embodiment of the invention.
Figure 11:
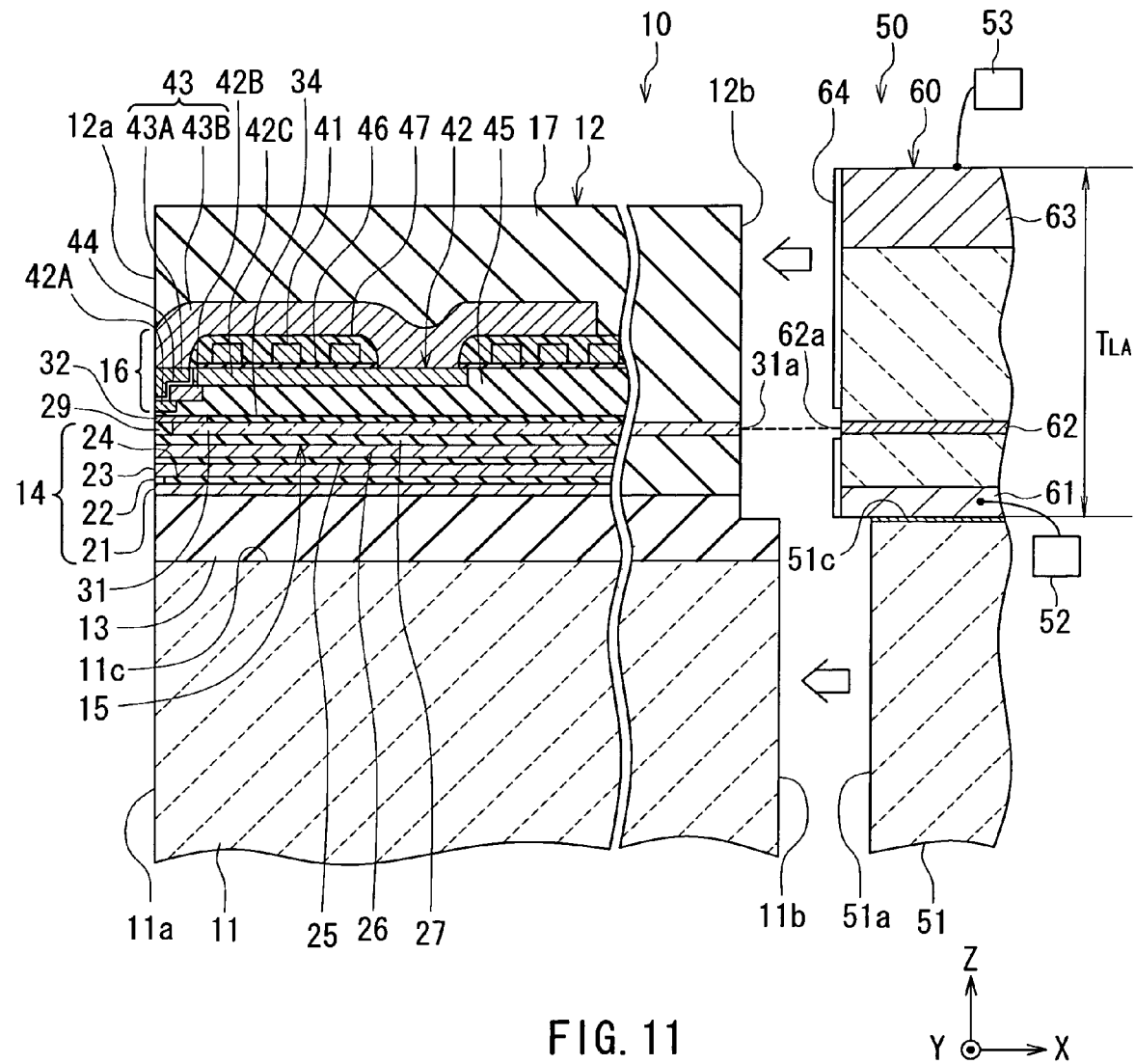
FIG. 11 shows a cross section taken along line 11-11 of FIG. 10.

The configuration of the heat-assisted magnetic recording head 1 according to the present embodiment will now be described with reference to FIG. 10 and FIG. 11. FIG. 10 is a perspective view of the heat-assisted magnetic recording head 1. FIG. 11 shows a cross section taken along line 11-11 of FIG. 10. The heat-assisted magnetic recording head 1 includes a slider 10 and a light source unit 50. FIG. 11 shows the slider 10 and the light source unit 50 in a separated state.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

For the components of the head unit 12, with respect to a reference position, a position located in a direction that is perpendicular to the element-forming surface 11c and gets away from the element-forming surface 11c is defined as "above", and a position located in a direction opposite to the above-mentioned direction is defined as "below". For any of the layers included in the head unit 12, the surface closer to the element-forming surface 11c is defined as a "bottom surface," and the surface farther from the element-forming surface 11c as a "top surface."

Moreover, X direction, Y direction, Z direction, −X direction, −Y direction and −Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 11. The Z direction is a direction perpendicular to the element-forming surface 11c and getting away from the element-forming surface 11c. The −X direction, the −Y direction and the −Z direction are opposite to the X direction, the Y direction and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. A track width direction is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces connecting the bonding surface 51a to the rear surface 51b. One of the four surfaces connecting the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The light-source-mounting surface 51c corresponds to the top surface of the support member of the present invention. The support member 51 may have the function of a heat sink for dissipating heat generated by the laser diode 60, in addition to the function of supporting the laser diode 60.

As shown in FIG. 11, the head unit 12 includes an insulating layer 13 disposed on the element-forming surface 11c, and a reproducing head 14, a near-field light generating device 15, a recording head 16 and a protection layer 17 that are stacked in this order on the insulating layer 13. The insulating layer 13 and the protection layer 17 are each made of an insulating material such as $Al_2O_3$ (hereinafter, also referred to as alumina).

The reproducing head 14 includes: a lower shield layer 21 disposed on the insulating layer 13; an MR element 22 disposed on the lower shield layer 21; an upper shield layer 23 disposed on the MR element 22; and an insulating layer 24 disposed between the lower shield layer 21 and the upper shield layer 23 around the MR element 22. The lower shield layer 21 and the upper shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. When the MR element 22 is a TMR element or a CPP-type GMR element, the lower shield layer 21 and the upper shield layer 23 may also function as electrodes for feeding the sense current to the MR element 22. When the MR element 22 is a CIP-type GMR element, insulating films are respectively provided between the MR element 22 and the lower shield layer 21 and between the MR element 22 and the upper shield layer 23, and two leads are provided between these insulating films in order to feed the sense current to the MR element 22.

The head unit 12 further includes an insulating layer 25 disposed on the upper shield layer 23, and a middle shield layer 26 disposed on the insulating layer 25. The middle shield layer 26 has the function of shielding the MR element 22 from a magnetic field produced in the recording head 16. The insulating layer 25 is made of an insulating material such as alumina. The middle shield layer 26 is made of a soft magnetic material. The insulating layer 25 and the middle shield layer 26 may be omitted.

The near-field light generating device 15 generates near-field light that is to be applied to the magnetic disk 201 when data is recorded on the magnetic disk 201 using a recording magnetic field produced from the recording head 16. The near-field light generating device 15 includes: a dielectric layer 27 disposed on the middle shield layer 26; a waveguide 31 disposed on the dielectric layer 27; a dielectric layer 29 disposed around the waveguide 31 on the dielectric layer 27; a near-field light generating element 32; a buffer layer 33 (not shown in FIG. 11); and a clad layer 34. The waveguide 31 has an incidence end 31a located in the rear surface 12b of the head unit 12. The configuration of the near-field light generating device 15 will be described in detail later.

The recording head 16 of the present embodiment is for use in perpendicular magnetic recording. The recording head 16 includes a coil 41, a magnetic pole 42, a write shield 43 and a gap layer 44. The coil 41 produces a magnetic field corresponding to data to be recorded on the magnetic disk 201. The magnetic pole 42 has an end face located in the medium facing surface 12a, allows a magnetic flux corresponding to the magnetic field produced by the coil 41 to pass, and produces a recording magnetic field for recording data on the magnetic disk 201 by means of a perpendicular magnetic recording system. The write shield 43 has an end face that is located in the medium facing surface 12a at a position forward of the magnetic pole 42 along the Z direction (in other words, located closer to the trailing end). The gap layer 44 is disposed between the magnetic pole 42 and the write shield 43. The magnetic pole 42 and the write shield 43 are each made of a soft magnetic material. The gap layer 44 is made of a nonmagnetic material. The distance between the end face of the magnetic pole 42 and the end face of the write shield 43 in the medium facing surface 12a falls within the range of 0.01 to 0.5 μm, for example. The gap layer 44 may be made of a nonmagnetic insulating material such as $Al_2O_3$, $SiO_2$, AlN or diamond-like-carbon (DLC), or a nonmagnetic conductive material such as Ru.

The recording head 16 further includes an insulating layer 45 disposed around the magnetic pole 42, and an insulating layer 46 disposed on a part of each of the top surfaces of the magnetic pole 42 and the insulating layer 45. The coil 41 is disposed on the insulating layer 46. The recording head 16 further includes an insulating layer 47 covering the coil 41. The insulating layers 45 and 46 are made of alumina, for example. The insulating layer 47 is made of photoresist, for example. The coil 41 is made of a conductive material such as copper.

A part of the write shield 43 is disposed on the insulating layer 47. The write shield 43 is connected to a part of the top surface of the magnetic pole 42 away from the medium facing surface 12a. The position of the end of a bit pattern to be recorded on the magnetic disk 201 depends on the position of an end of the end face of the magnetic pole 42 located closer to the gap layer 44 in the medium facing surface 12a. The write shield 43 takes in a magnetic flux that is generated from the end face of the magnetic pole 42 located in the medium facing surface 12a and that expands in directions except the direction perpendicular to the plane of the magnetic disk 201, and thereby prevents this magnetic flux from reaching the magnetic disk 201. It is thereby possible to improve the recording density. Furthermore, the write shield 43 takes in a disturbance magnetic field applied from outside the heat-assisted magnetic recording head 1 to the head 1. It is thereby possible to prevent erroneous recording on the magnetic disk 201 caused by the disturbance magnetic field intensively taken into the magnetic pole 42. The write shield 43 further has the function of returning a magnetic flux that has been generated from the end face of the magnetic pole 42 and has magnetized the magnetic disk 201.

As shown in FIG. 11, the protection layer 17 is disposed to cover the recording head 16. As shown in FIG. 10, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to the plurality of pad-shaped terminals of the wiring member 224 shown in FIG. 9.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 µm. Specifically, the laser diode 60 may be an InGaAsP/InP quaternary mixed crystal laser diode having an emittable wavelength range of 1.2 to 1.67 µm, for example.

As shown in FIG. 11, the laser diode 60 has a multilayer structure including a lower electrode 61, an active layer 62 and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 µm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 9. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 11. The laser diode 60 and the waveguide 31 are positioned so that the laser light emitted from the laser diode 60 will be incident on the incidence end 31a of the waveguide 31.

Figure 1:
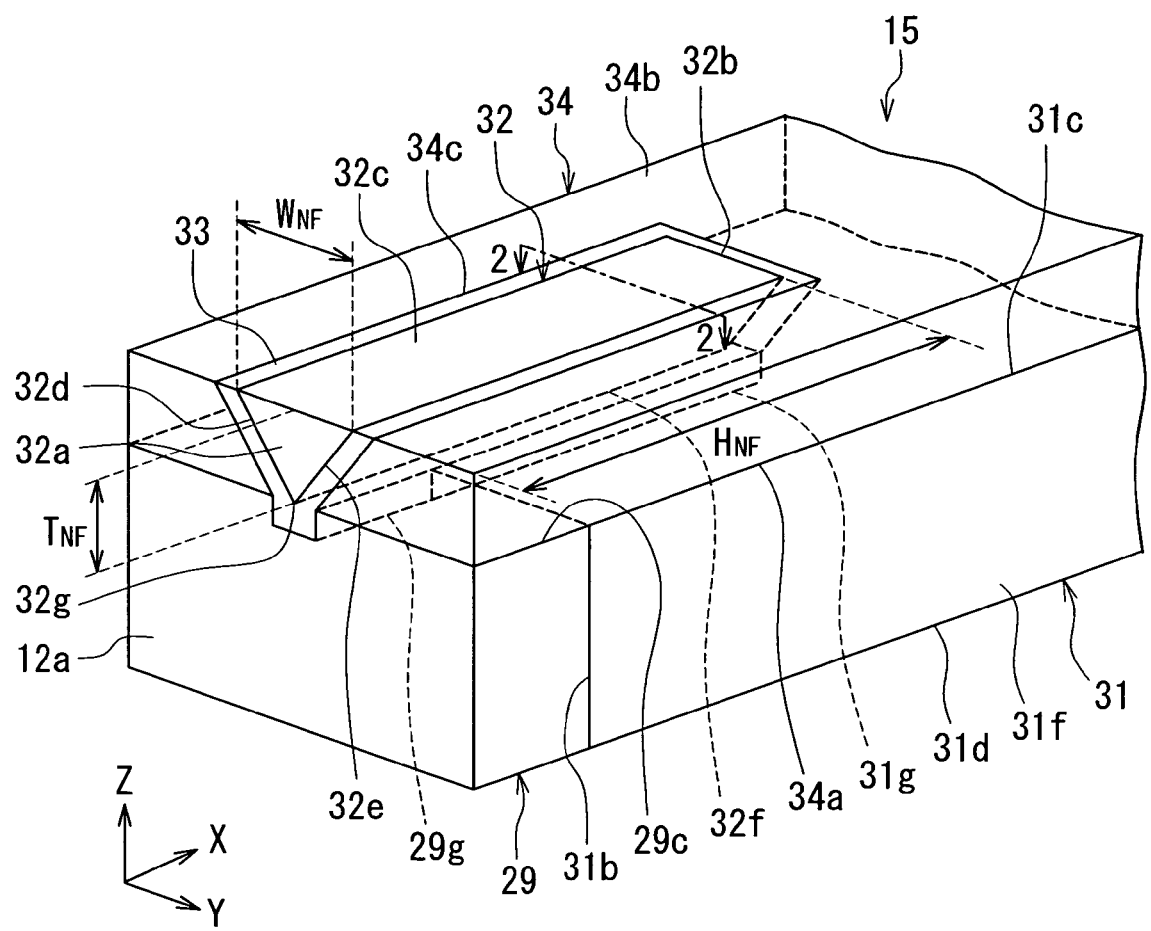
FIG. 1 is a perspective view of a near-field light generating device according to an embodiment of the invention.
Figure 2:
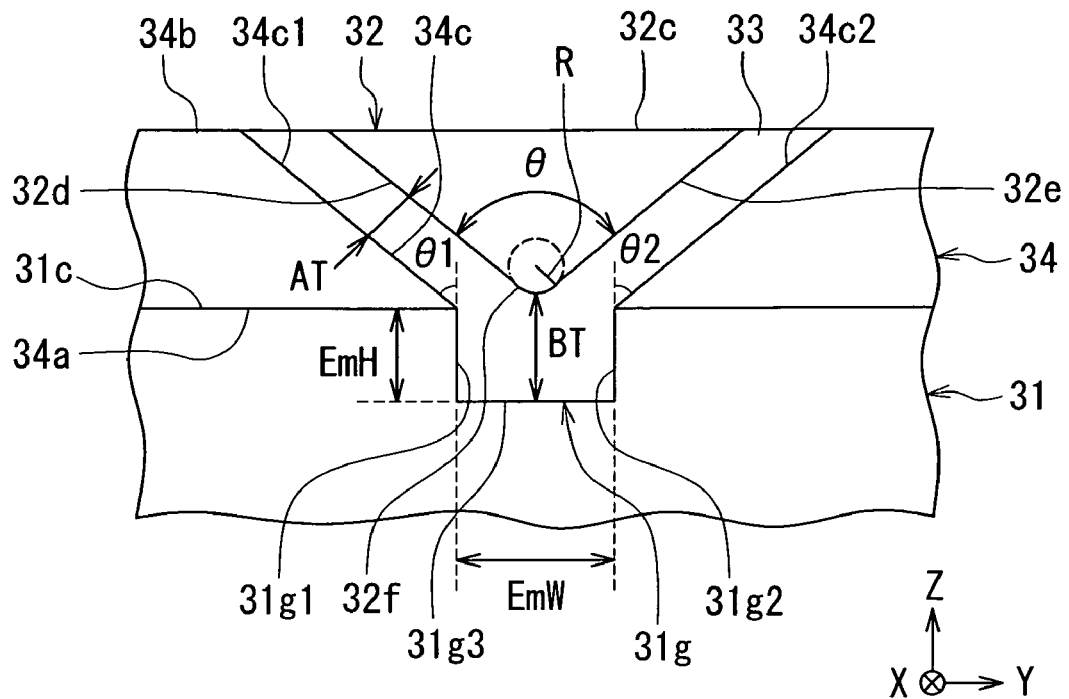
FIG. 2 is a cross-sectional view showing an example of the main part of the near-field light generating device according to the embodiment of the invention.
Figure 3:
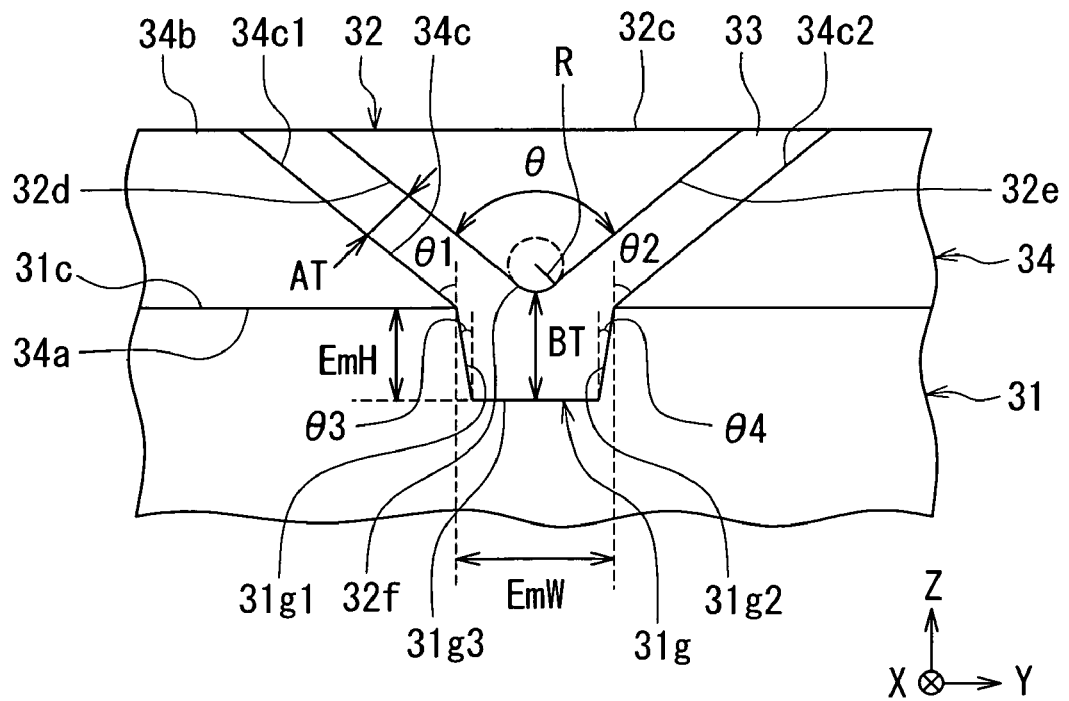
FIG. 3 is a cross-sectional view showing another example of the main part of the near-field light generating device according to the embodiment of the invention.
Figure 4:
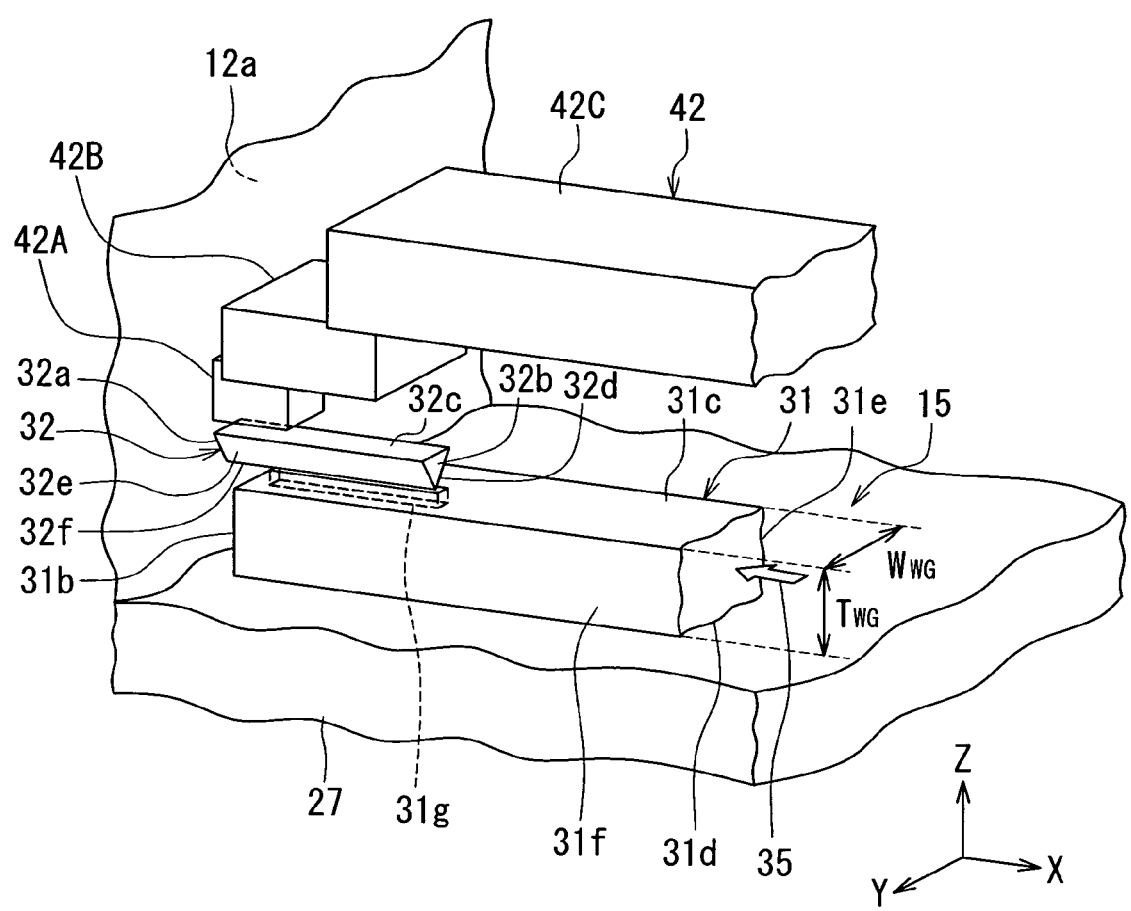
FIG. 4 is a perspective view showing the near-field light generating device and a magnetic pole of a heat-assisted magnetic recording head according to the embodiment of the invention.
Figure 5:
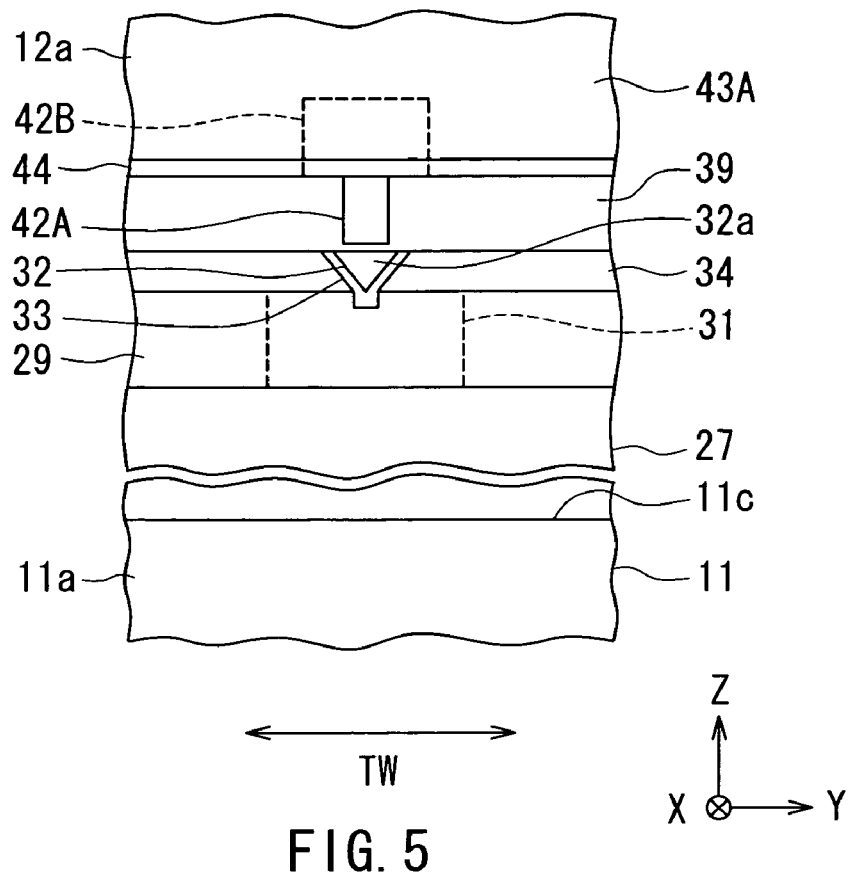
FIG. 5 is a front view showing a part of a medium facing surface of a head unit of the heat-assisted magnetic recording head according to the embodiment of the invention.
Figure 6:
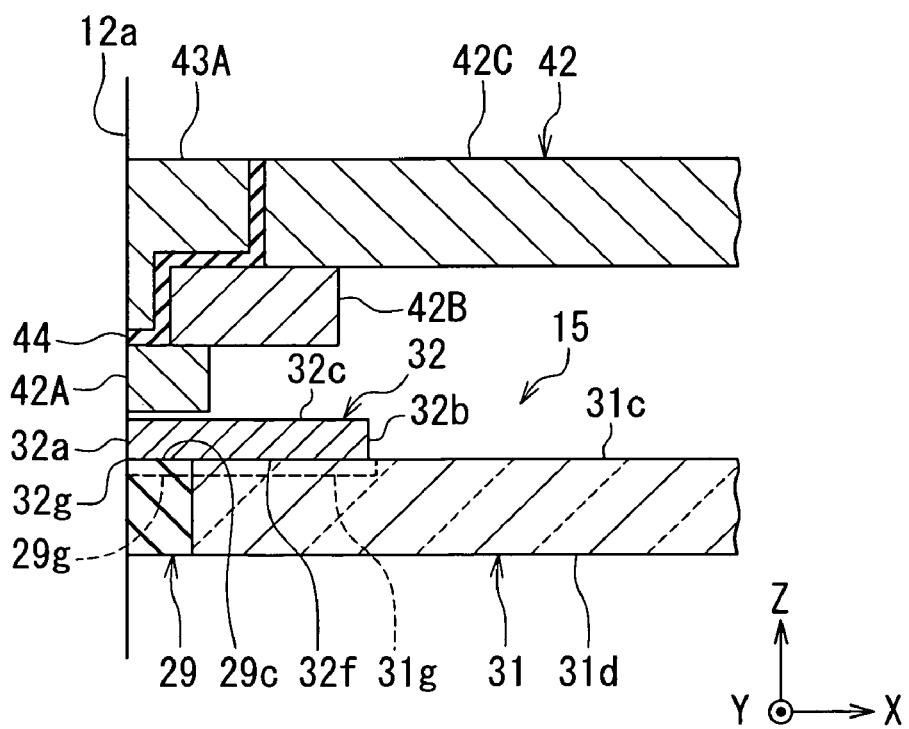
FIG. 6 is a cross-sectional view of the near-field light generating device and the magnetic pole of the heat-assisted magnetic recording head according to the embodiment of the invention.
Figure 7:
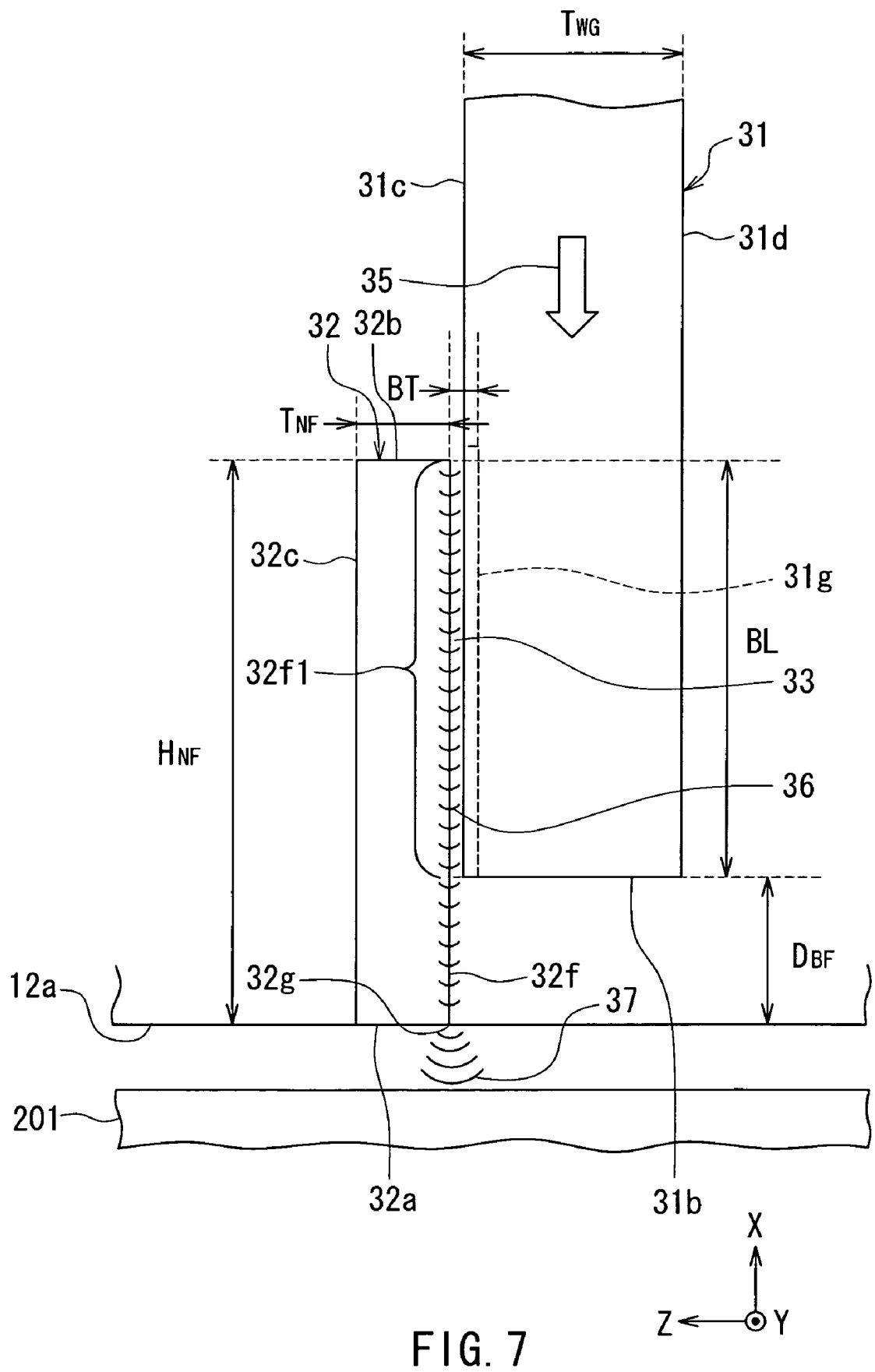
FIG. 7 is an explanatory diagram for explaining the principle of generation of near-field light by the near-field light generating device according to the embodiment of the invention.

The configuration of the near-field light generating device 15 will now be described in detail with reference to FIG. 1 to FIG. 7. FIG. 1 is a perspective view of the near-field light generating device 15. FIG. 2 is a cross-sectional view showing an example of the main part of the near-field light generating device 15 at a position indicated by line 2-2 of FIG. 1. FIG. 3 is a cross-sectional view showing another example of the main part of the near-field light generating device 15 at the position indicated by line 2-2 of FIG. 1. FIG. 4 is a perspective view showing the near-field light generating device 15 and the magnetic pole 42. FIG. 5 is a front view showing a part of the medium facing surface 12a of the head unit 12. FIG. 6 is a cross-sectional view of the near-field light generating device 15 and the magnetic pole 42. FIG. 7 is an explanatory diagram for explaining the principle of generation of near-field light by the near-field light generating device 15. In FIG. 5 the arrow designated by the symbol TW indicates the track width direction. The track width direction is parallel to the Y direction.

The waveguide 31 extends in the direction perpendicular to the medium facing surface 12a (the X direction). The waveguide 31 has: the incidence end 31a shown in FIG. 11; an end face 31b closer to the medium facing surface 12a; a top surface 31c; a bottom surface 31d; and two side surfaces 31e and 31f. The bottom surface 31d is in contact with the top surface of the dielectric layer 27. The dielectric layer 29 disposed around the waveguide 31 has a top surface 29c. The end face 31b may be located in the medium facing surface 12a or away from the medium facing surface 12a. FIG. 1 to FIG. 7 show the case where the end face 31b is located away from the medium facing surface 12a. In this case, a part of the dielectric layer 29 is interposed between the end face 31b and the medium facing surface 12a. The waveguide 31 allows propagation of laser light 35 that is emitted from the laser diode 60 and incident on the incidence end 31a.

As shown in FIG. 1 to FIG. 4, the waveguide 31 has a groove 31g that opens in the top surface 31c and that is long in a first direction parallel to the top surface 31c. The first direction is a direction parallel to the X direction. As shown in FIG. 2 and FIG. 3, the groove 31g has a bottom 31g3 that is long in the first direction (the X direction), and first and second groove sidewalls 31g1 and 31g2 that couple the bottom 31g3 and the top surface 31c to each other and that are long in the first direction (the X direction).

As shown in FIG. 1, in the case where the end face 31b of the waveguide 31 is located away from the medium facing surface 12a, the dielectric layer 29 has a groove 29g located in the area between the end face 31b of the waveguide 31 and the medium facing surface 12a. The groove 29g opens in the top surface 29c and extends in the first direction (the X direction) so as to be contiguous to the groove 31g. The cross section of the groove 29g parallel to the medium facing surface 12a has the same shape as the cross section of the groove 31g parallel to the medium facing surface 12a. The groove 29g does not exist in the case where the end face 31b of the waveguide 31 is located in the medium facing surface 12a.

As shown in FIG. 1 to FIG. 3, the clad layer 34 has a bottom surface 34a, a top surface 34b, and an opening 34c. The bottom surface 34a is in contact with the top surface 31c of the waveguide 31 and the top surface 29c of the dielectric layer 29. The top surface 34b is opposite to the bottom surface 34a.

The opening 34c penetrates the clad layer 34 from the top surface 34b to the bottom surface 34a and is contiguous to the grooves 31g and 29g.

As shown in FIG. 2 and FIG. 3, the opening 34c has first and second opening sidewalls 34c1 and 34c2 that decrease in distance from each other toward the top surface 31c of the waveguide 31. Here, the angle that the first opening sidewall 34c1 forms with respect to a second direction perpendicular to the top surface 31c of the waveguide 31 will be designated by the symbol θ1. The angle that the second opening sidewall 34c2 forms with respect to the second direction will be designated by the symbol θ2. The second direction is parallel to the Z direction. The angle θ1 and the angle θ2 are preferably equal to each other.

The first groove sidewall 31g1 is contiguous to the first opening sidewall 34c1. The second groove sidewall 31g2 is contiguous to the second opening sidewall 34c2. As shown in FIG. 3, the angle that the first groove sidewall 31g1 forms with respect to the second direction (the Z direction) will be designated by the symbol θ3, and the angle that the second groove sidewall 31g2 forms with respect to the second direction will be designated by the symbol θ4. The angle θ3 that the first groove sidewall 31g1 forms with respect to the second direction is smaller than the angle θ1 that the first opening sidewall 34c1 forms with respect to the second direction. The angle θ4 that the second groove sidewall 31g2 forms with respect to the second direction is smaller than the angle θ2 that the second opening sidewall 34c2 forms with respect to the second direction. FIG. 2 shows the case where the angles θ3 and θ4 that the groove sidewalls 31g1 and 31g2 respectively form with respect to the second direction are both 0°. The symbols θ3 and θ4 are therefore omitted from FIG. 2. The angles that the groove sidewalls 31g1 and 31g2 respectively form with respect to the second direction are not limited to 0°, and have only to be smaller than θ1 and θ2, respectively. FIG. 3 shows the case where the angles θ3 and θ4 that the groove sidewalls 31g1 and 31g2 respectively form with respect to the second direction are other than 0°. When the angles θ3 and θ4 are other than 0°, as shown in FIG. 3, the groove sidewalls 31g1 and 31g2 may be tilted with respect to the second direction so as to decrease in distance from each other toward the bottom 31g3.

As shown in FIG. 1, the near-field light generating element 32 is long in the first direction (the X direction) and is accommodated in the opening 34c at least in part. In the grooves 31g and 29g and the opening 34c, the buffer layer 33 is interposed between the near-field light generating element 32 and each of the waveguide 31, the dielectric layer 29 and the clad layer 34. In the case where the end face 31b of the waveguide 31 is located in the medium facing surface 12a, the groove 29g does not exist and therefore the buffer layer 33 is interposed between the near-field light generating element 32 and each of the waveguide 31 and the clad layer 34 in the groove 31g and the opening 34c.

The near-field light generating element 32 is generally triangular-prism-shaped as will be detailed below. The near-field light generating element 32 has a first end face 32a located in the medium facing surface 12a, a second end face 32b opposite to the first end face 32a, a top surface 32c, and first and second side surfaces 32d and 32e. The first side surface 32d is opposed to the first opening sidewall 34c1 with the buffer layer 33 therebetween. The first side surface 32d is parallel to or nearly parallel to the first opening sidewall 34c1. The second side surface 32e is opposed to the second opening sidewall 34c2 with the buffer layer 33 therebetween. The second side surface 32e is parallel to or nearly parallel to the second opening sidewall 34c2. The first and second side surfaces 32d and 32e decrease in distance from each other toward the groove 31g.

The near-field light generating element 32 further has an edge part 32f and a near-field light generating part 32g. The edge part 32f connects the first and second side surfaces 32d and 32e to each other, and is opposed to the groove 31g with the buffer layer 33 therebetween. The near-field light generating part 32g is located in the medium facing surface 12a and generates near-field light. The near-field light generating part 32g lies at one end of the edge part 32f that is located in the medium facing surface 12a. The angle formed between the first side surface 32d and the second side surface 32e will be referred to as a point angle, and will be denoted by the symbol θ as shown in FIG. 2 and FIG. 3. The edge part 32f has a cylindrical surface configuration that connects the lower edges of the first and second side surfaces 32d and 32e to each other. The radius of curvature of the edge part 32f will be referred to as a point radius, and will be denoted by the symbol R as shown in FIG. 2 and FIG. 3. Specifically, the near-field light generating part 32g refers to the end of the edge part 32f in the end face 32a and its vicinity. The point angle θ falls within the range of 80° to 120°, for example. The point radius R falls within the range of 0 to 50 nm, for example.

The point radius R can be determined in the following manner, for example. Initially, an image of the first end face 32a of the near-field light generating element 32 is obtained using a scanning ion microscope (SIM) which accompanies a focused ion beam (FIB) system. On the image, a circle of appropriate size that is inscribed in the edge part 32f and the side surfaces 32d and 32e, like the one shown by the broken line in each of FIG. 2 and FIG. 3, is drawn. Then, the radius of the circle is determined as the point radius R.

The maximum width $W_{NF}$ of the near-field light generating element 32 in the track width direction (the Y direction) and the thickness (dimension in the Z direction) $T_{NF}$ of the near-field light generating element 32 are both sufficiently smaller than the wavelength of the laser light 35. $W_{NF}$ falls within the range of 100 to 300 nm, for example. $T_{NF}$ falls within the range of 60 to 150 nm, for example. The near-field light generating element 32 has a length $H_{NF}$ in the X direction of, for example, 0.5 to 3 μm.

In the vicinity of the near-field light generating element 32, the waveguide 31 has a width $W_{WG}$ in the track width direction (the Y direction) of, for example, 0.3 to 1 μm. In the vicinity of the near-field light generating element 32, the waveguide 31 has a thickness (dimension in the Z direction) $T_{WG}$ of, for example, 0.1 to 1 μm.

As shown in FIG. 2 and FIG. 3, the depth (dimension in the Z direction) of the groove 31g will be denoted by the symbol EmH, the width of the opening of the groove 31g in the track width direction (the Y direction) will be denoted by the symbol EmW, and the distance between the bottom 31g3 of the groove 31g and the edge part 32f of the near-field light generating element 32 will be denoted by the symbol BT. The depth EmH falls within the range of 20 to 200 nm, for example. The width EmW falls within the range of 100 to 300 nm, for example. The distance BT falls within the range of 20 to 100 nm, for example. BT may be smaller than EmH, or may be equal to or greater than EmH. If BT is smaller than EmH, a part of the near-field light generating element 32 is accommodated in the groove 31g with the buffer layer 33 therebetween. The thickness of the buffer layer 33 in a particular area will be denoted by the symbol AT. Here, the particular area includes the area where the first side surface 32d of the near-field light generating element 32 and the first opening sidewall 34c1 are opposed to each other and the area where the second side surface 32e of the near-field light generating element 32 and the second opening sidewall 34c2 are opposed to each other. AT is smaller than BT, and falls within the range of 10 to 90 nm, for example.

The near-field light generating element 32 is made of a conductive material such as metal. For example, the near-field light generating element 32 may be made of one element selected from the group consisting of Pd, Pt, Rh, Ir, Ru, Au, Ag, Cu and Al, or an alloy composed of a plurality of elements selected from this group.

The waveguide 31 is made of a dielectric material that allows the laser light 35 to pass. Each of the dielectric layers 27, 29, the buffer layer 33 and the clad layer 34 is made of a dielectric material and has a refractive index lower than that of the waveguide 31. The waveguide 31 excluding the incidence end 31a is thus covered with the dielectric material that is lower in refractive index than the waveguide 31. The dielectric layers 27 and 29, the buffer layer 33 and the clad layer 34 may be made of the same material or different materials.

For example, if the laser light 35 has a wavelength of 600 nm and the waveguide 31 is made of $Al_2O_3$ (refractive index n=1.63), the dielectric layers 27 and 29, the buffer layer 33 and the clad layer 34 may be made of $SiO_2$ (refractive index n=1.46). If the waveguide 31 is made of tantalum oxide such as $Ta_2O_5$ (n=2.16), the dielectric layers 27 and 29, the buffer layer 33 and the clad layer 34 may be made of $SiO_2$ (n=1.46) or $Al_2O_3$ (n=1.63).

As shown in FIG. 7, the edge part 32f of the near-field light generating element 32 includes a coupling part 32f1 that is opposed to the groove 31g of the waveguide 31 with the buffer layer 33 therebetween. Surface plasmons are excited on the coupling part 32f1 through coupling with evanescent light that occurs from the interface between the waveguide 31 and the buffer layer 33. Note that surface plasmons may be excited not only on the coupling part 32f1 of the near-field light generating element 32 but also on a part of the outer surface of the near-field light generating element 32 that is in the vicinity of the coupling part 32f1. Here, the length of the coupling part 32f1 will be denoted by BL. The surface plasmons that are excited at least on the coupling part 32f1 of the outer surface of the near-field light generating element 32 propagate along the edge part 32f to reach the near-field light generating part 32g. Based on the surface plasmons, the near-field light generating part 32g generates near-field light.

BT and BL are important parameters in achieving appropriate excitation and propagation of surface plasmons. BT preferably falls within the aforementioned range of 20 to 100 nm. BL preferably falls within the range of 0.5 to 3 μm.

The distance $D_{BF}$ between the end face 31b of the waveguide 31 and the medium facing surface 12a falls within the range of 0 to 2.0 μm, for example.

Reference is now made to FIG. 7 to describe the principle of generation of near-field light by the near-field light generating device 15 and the principle of heat-assisted magnetic recording using the near-field light. The laser light 35 emitted from the laser diode 60 propagates through the waveguide 31 to reach near the buffer layer 33. Here, the laser light is totally reflected at the interface between the waveguide 31 and the buffer layer 33, and this generates evanescent light permeating into the buffer layer 33. Then, this evanescent light and fluctuations of charges in at least the coupling part 32f1 of the outer surface of the near-field light generating element 32 are coupled with each other to induce a surface plasmon mode, whereby surface plasmons are excited on at least the coupling part 32f1 of the outer surface of the near-field light generating element 32. To be more precise, what are excited in this system are surface plasmon polaritons because surface plasmons, which are the elementary excitations, are coupled with electromagnetic waves. Nevertheless, surface plasmon polaritons will hereinafter be referred to as surface plasmons, with polariton omitted.

The surface plasmons 36 excited on at least the coupling part 32f1 of the outer surface of the near-field light generating element 32 propagate along the edge part 32f to reach the near-field light generating part 32g. As a result, the surface plasmons 36 concentrate on the near-field light generating part 32g, and near-field light 37 thus occurs from the near-field light generating part 32g based on the surface plasmons 36. The near-field light 37 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, data recording is performed by applying a recording magnetic field produced by the magnetic pole 42 to the part of the magnetic recording layer whose coercivity has been lowered in this way.

The near-field light generating device 15 according to the present embodiment is capable of converting the laser light that propagates through the waveguide 31 into near-field light with higher light use efficiency, compared with the case where near-field light is generated from a plasmon antenna by directly irradiating the plasmon antenna with laser light. Consequently, according to the present embodiment, it is possible to prevent a part of the medium facing surface 12a from protruding due to conversion of the energy of the laser light into thermal energy in a heat-assisted magnetic recording head.

An example of the configuration of the magnetic pole 42 will now be described with reference to FIG. 4 to FIG. 6. In this example, the magnetic pole 42 includes a first layer 42A, a second layer 42B and a third layer 42C. As shown in FIG. 5, the first layer 42A has an end face that is located in the medium facing surface 12a at a position forward of the first end face 32a of the near-field light generating element 32 along the Z direction (in other words, located closer to the trailing end). The distance between this end face of the first layer 42A and the first end face 32a preferably falls within the range of 20 to 50 nm. The second layer 42B is disposed on the first layer 42A and touches the top surface of the first layer 42A. The second layer 42B has an end face that is closer to the medium facing surface 12a, and this end face is located at a distance from the medium facing surface 12a. The third layer 42C is disposed on the second layer 42B and touches the top surface of the second layer 42B. The third layer 42C has an end face that is closer to the medium facing surface 12a, and this end face is located at a distance from the medium facing surface 12a. The distance between the end face of the third layer 42C and the medium facing surface 12a is greater than the distance between the end face of the second layer 42B and the medium facing surface 12a.

Next, an example of the configuration of the write shield 43 will be described with reference to FIG. 6 and FIG. 11. In this example, the write shield 43 includes a first layer 43A and a second layer 43B. As shown in FIG. 6, the first layer 43A is separated from the magnetic pole 42 by the gap layer 44 and disposed between the medium facing surface 12a and the respective end faces of the second layer 42B and the third layer 42C of the magnetic pole 42. As shown in FIG. 11, the second layer 43B is disposed on the first layer 43A, the insulating layer 47 and the third layer 42C of the magnetic pole 42. A part of the second layer 43B located near the medium facing surface 12a touches the top surface of the first layer 43A, and another part of the second layer 43B located away from the medium facing surface 12a touches the top surface of the third layer 42C.

The configurations of the magnetic pole 42 and the write shield 43 are not limited to the above-described configurations. For example, the magnetic pole 42 may be composed of one or two layers. The write shield 43 may be composed of one layer or three or more layers.

Figure 12:
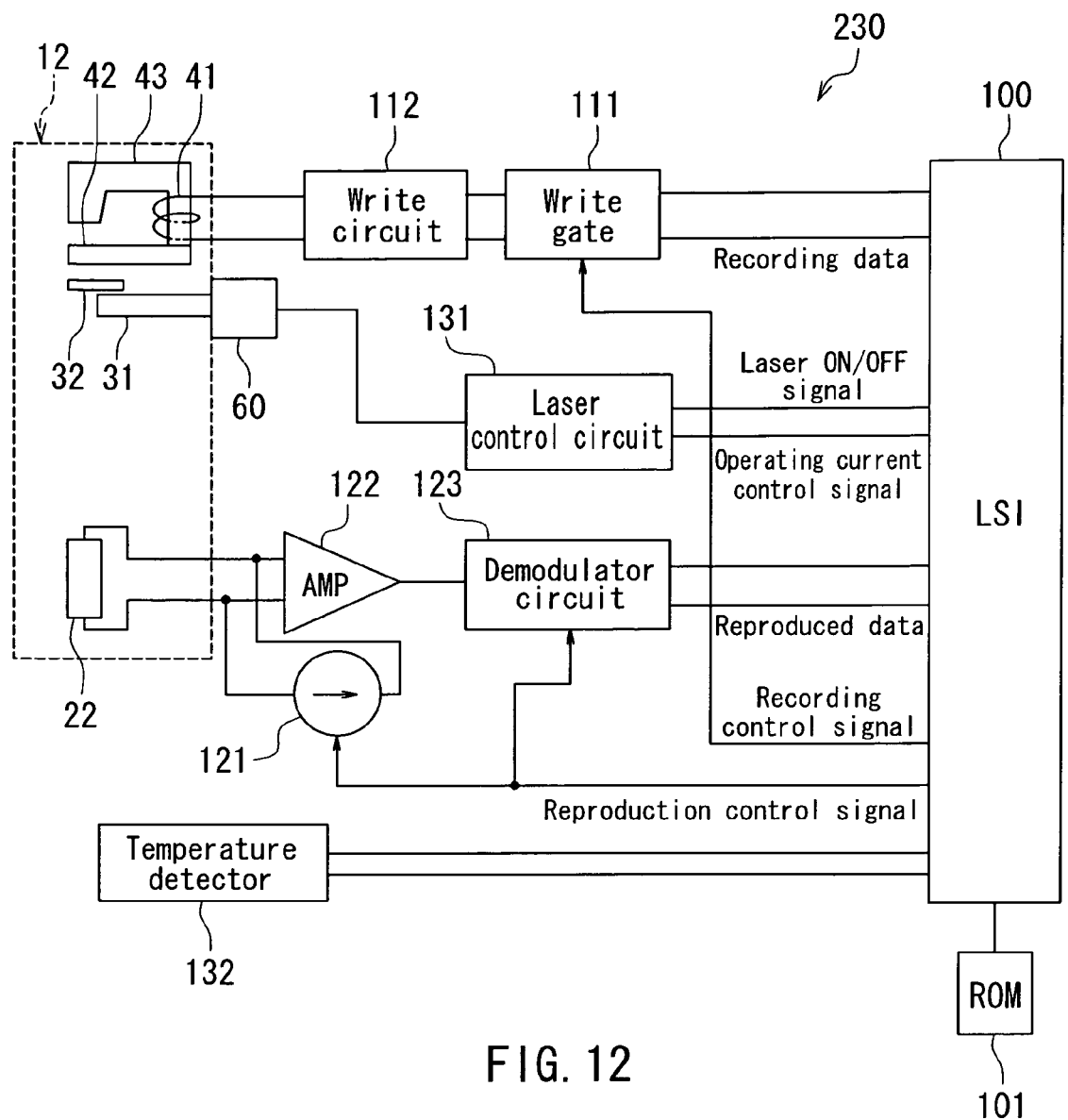
FIG. 12 is a block diagram showing a circuit configuration of the magnetic recording device according to the embodiment of the invention.

Reference is now made to FIG. 12 to describe the circuit configuration of the control circuit 230 shown in FIG. 8 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies recording data and a recording control signal to the write gate 111. The control LSI 100 supplies a reproduction control signal to the constant current circuit 121 and the demodulator circuit 123, and receives reproduced data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a recording operation, the control LSI 100 supplies recording data to the write gate 111. The write gate 111 supplies the recording data to the write circuit 112 only when the recording control signal indicates a recording operation. According to the recording data, the write circuit 112 passes a recording current through the coil 41. Consequently, the magnetic pole 42 produces a recording magnetic field and data is recorded on the magnetic recording layer of the magnetic disk 201 through the use of this recording magnetic field.

In a reproducing operation, the constant current circuit 121 supplies a certain sense current to the MR element 22 only when the reproduction control signal indicates a reproducing operation. The output voltage of the MR element 22 is amplified by the amplifier 122 and input to the demodulator circuit 123. When the reproduction control signal indicates a reproducing operation, the demodulator circuit 123 demodulates the output of the amplifier 122 to generate reproduced data, and supplies the reproduced data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and this laser light propagates through the waveguide 31. According to the principle of generation of near-field light described above, the near-field light 37 occurs from the near-field light generating part 32g of the near-field light generating element 32. The near-field light 37 heats a part of the magnetic recording layer of the magnetic disk 201, thereby lowering the coercivity of that part. When recording, data is recorded by applying the recording magnetic field produced by the magnetic pole 42 to the part of the magnetic recording layer with the lowered coercivity.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 37, and data that indicates the temperature dependence of the coercivity of the magnetic recording layer.

As shown in FIG. 12, the control circuit 230 has the signal system for controlling the laser diode 60, i.e., the signal system consisting of the laser ON/OFF signal and the operating current control signal, independent of the control signal system intended for recording/reproducing operations. This configuration makes it possible to implement various modes of energization of the laser diode 60, not only to energize the laser diode 60 simply in association with a recording operation. It should be noted that the circuit configuration of the control circuit 230 is not limited to the one shown in FIG. 12.

A method of manufacturing the near-field light generating device 15 according to the present embodiment will now be described. The method of manufacturing the near-field light generating device 15 according to the present embodiment includes the steps of forming the waveguide 31 and the clad layer 34; forming the buffer layer 33 in the groove 31g of the waveguide 31 and the opening 34c of the clad layer 34 so that the waveguide 31, the clad layer 34 and the buffer layer 33 constitute a frame for forming the near-field light generating element 32; and forming the near-field light generating element 32 in the frame. Reference is now made to FIG. 13 to FIG. 17 to describe the method of manufacturing the near-field light generating device 15 according to the present embodiment in detail. FIG. 13 to FIG. 17 each show a cross section of part of a stack of layers formed in the process of manufacturing the near-field light generating device 15.

Figure 13:
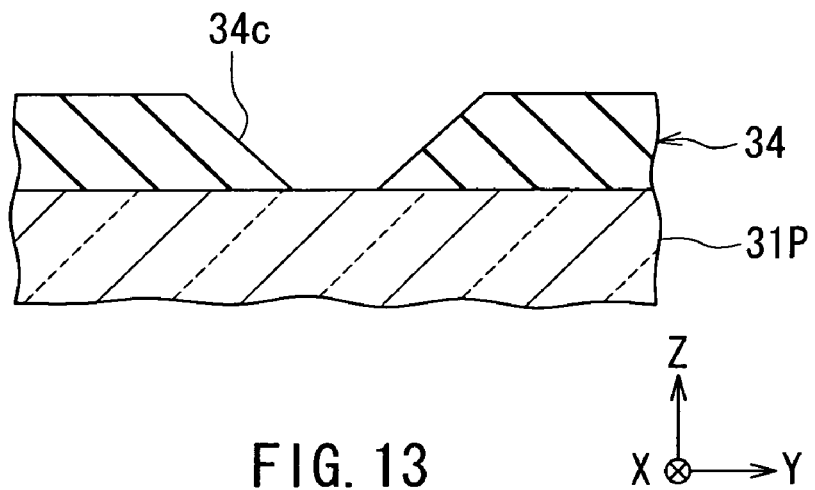
FIG. 13 is an explanatory diagram showing a step of a method of manufacturing the near-field light generating device according to the embodiment of the invention.

FIG. 13 shows a step in the process of manufacturing the near-field light generating device 15. In this step, first, a preliminary waveguide 31P and the dielectric layer 29 (not shown) are formed on the dielectric layer 27 (not shown). The preliminary waveguide 31P is intended to make the waveguide 31 by undergoing formation of the groove 31g therein afterward. The clad layer 34 having the opening 34c is then formed on the preliminary waveguide 31P and the dielectric layer 29. The clad layer 34 can be formed by, for example, initially forming a dielectric layer for making the clad layer 34 and then forming the opening 34c in the dielectric layer by taper-etching using reactive ion etching (hereinafter referred to as RIE).

Figure 14:
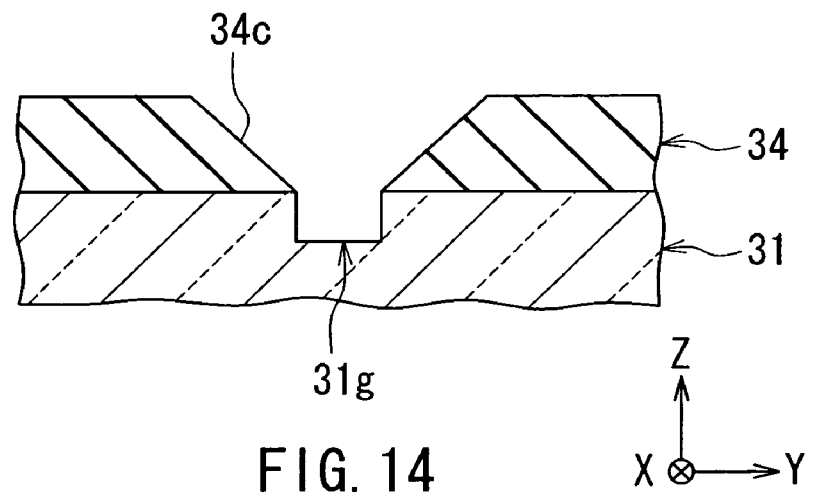
FIG. 14 is an explanatory diagram showing a step that follows the step of FIG. 13.

FIG. 14 shows the next step. In this step, the preliminary waveguide 31P is etched using the clad layer 34 having the opening 34c as the etching mask, whereby the groove 31g is formed in the preliminary waveguide 31P. The waveguide 31 is thereby completed. In the case where a part of the dielectric layer 29 is interposed between the end face 31b of the waveguide 31 and the medium facing surface 12a, the groove 29g of the dielectric layer 29 is formed simultaneously with the formation of the groove 31g in the preliminary waveguide 31P. The process so far is the step of forming the waveguide 31 and the clad layer 34.

The etching of the preliminary waveguide 31P using the clad layer 34 as the etching mask is preferably performed under the condition that the etching selectivity, that is, the etching rate of the preliminary waveguide 31P divided by the etching rate of the clad layer 34, is higher than 1. Etching the preliminary waveguide 31P under such a condition allows forming the groove 31g so that, as shown in FIG. 2 and FIG. 3, the angle that the first groove sidewall 31g1 forms with respect to the second direction (the Z direction) is smaller than the angle θ1 that the first opening sidewall 34c1 forms with respect to the second direction and the angle that the second groove sidewall 31g2 forms with respect to the second direction is smaller than the angle θ2 that the second opening sidewall 34c2 forms with respect to the second direction. For example, when the material of the waveguide 31 (preliminary waveguide 31P) is tantalum oxide and the material of the clad layer 34 is $Al_2O_3$, it is possible to form the groove 31g into the above-described configuration by etching the preliminary waveguide 31P by RIE using $CF_4$ as the etching gas. The etching selectivity in this case is approximately 10.

When forming the groove 29g of the dielectric layer 29 simultaneously with the formation of the groove 31g in the preliminary waveguide 31P, the preliminary waveguide 31P and the dielectric layer 29 are preferably etched under the condition that the etching selectivity of the preliminary waveguide 31P to the clad layer 34 is higher than 1 and the etching selectivity of the dielectric layer 29 to the clad layer 34 is higher than 1. The foregoing condition is satisfied by, for example, employing tantalum oxide as the material of the waveguide 31 (preliminary waveguide 31P), $Al_2O_3$ as the material of the clad layer 34 and $SiO_2$ as the material of the dielectric layer 29, and etching the preliminary waveguide 31P and the dielectric layer 29 by RIE using $CF_4$ as the etching gas.

Figure 15:
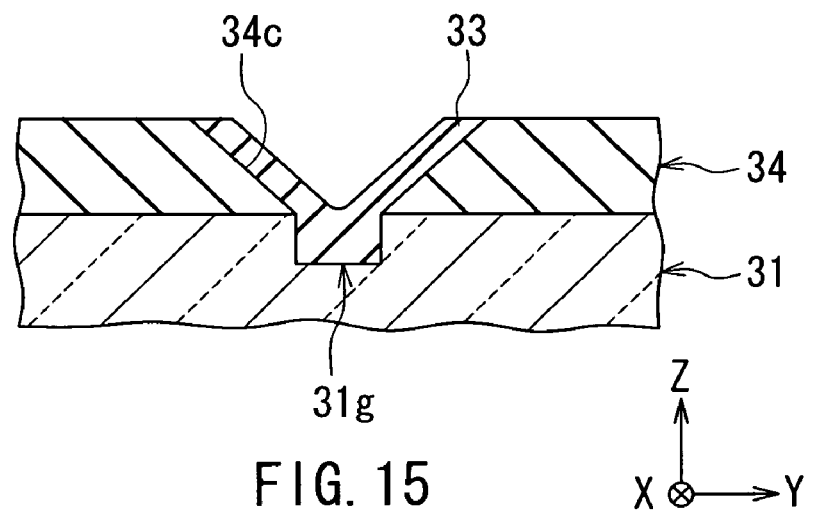
FIG. 15 is an explanatory diagram showing a step that follows the step of FIG. 14.

FIG. 15 shows the next step. In this step, the buffer layer 33 is formed in the groove 31g, the groove 29g (only in the case where it exists) and the opening 34c. The buffer layer 33 is preferably formed by a forming method that provides excellent step coverage. For example, atomic layer deposition (ALD) may be employed as such a forming method. By forming the buffer layer 33, a frame for forming the near-field light generating element 32 is formed by the waveguide 31, the dielectric layer 29 (only in the case where the groove 29g exists), the clad layer 34 and the buffer layer 33.

Figure 16:
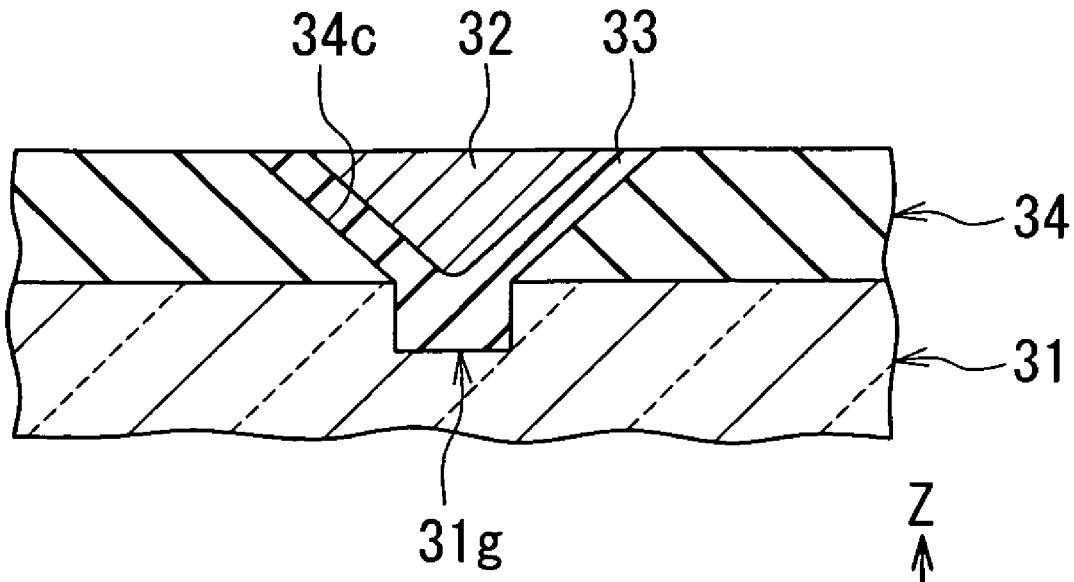
FIG. 16 is an explanatory diagram showing a step that follows the step of FIG. 15.

FIG. 16 shows the next step. In this step, the near-field light generating element 32 is formed by, for example, sputtering, in the frame formed in the step of FIG. 15. The clad layer 34, the buffer layer 33 and the near-field light generating element 32 are then flattened at the top by chemical mechanical polishing (CMP), for example.

Figure 17:
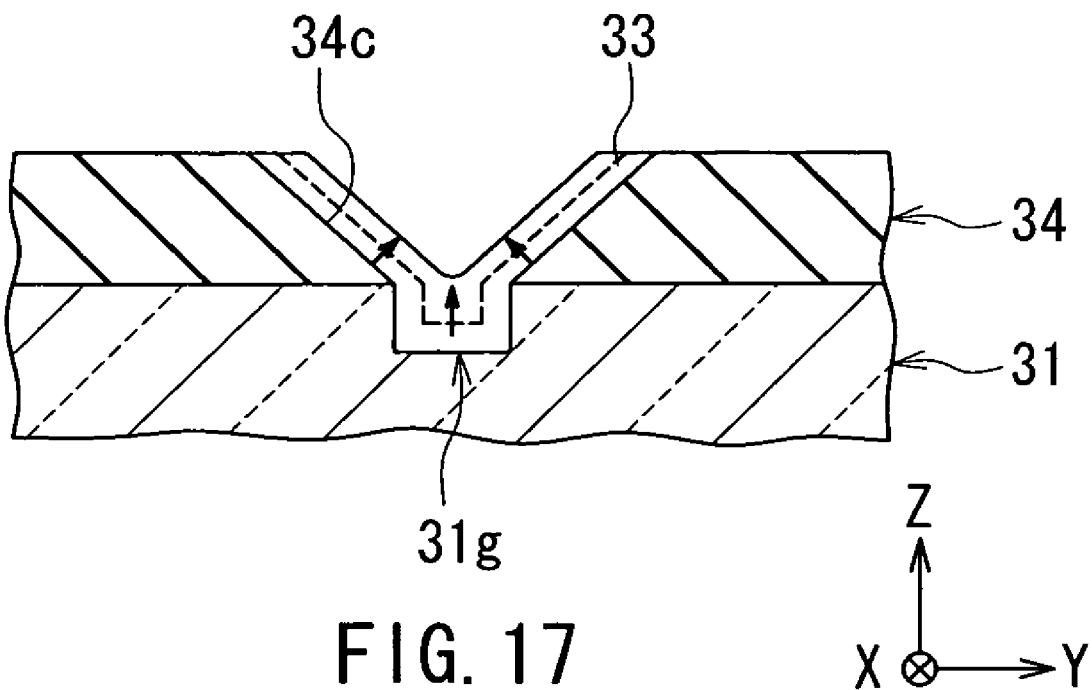
FIG. 17 is an explanatory diagram showing the growth process of a buffer layer in the step of FIG. 15.

According to the method of manufacturing the near-field light generating device 15 described above, it is possible to form the near-field light generating element 32 having a desired point angle θ and a small point radius R. The reason will be described in detail below. With reference to FIG. 17, a description will initially be given of the growth process of the buffer layer 33 in the step shown in FIG. 15. Before the formation of the buffer layer 33, the recess formed by the groove 31g and the opening 34c is shaped like a combination of an isosceles triangle with its vertex downward and a deeper recess in the vicinity of the vertex, as viewed in a cross section parallel to the medium facing surface 12a. When the buffer layer 33 is formed in the recess of such a shape, the buffer layer 33 grows in the manner shown by the arrows in FIG. 17. In the growth process of the buffer layer 33, respective films grown from the bottom 31g3 and the first and second groove sidewalls 31g1 and 31g2 join with each other, so that the buffer layer 33 grows faster in the groove 31g than on the wall faces of the opening 34c. Therefore, by forming the buffer layer 33 into an appropriate thickness, the shape of the recess formed by the top surface of the buffer layer 33 becomes close to an ideal isosceles triangle that is acute in the vicinity of the vertex, as viewed in a cross section parallel to the medium facing surface 12a. Consequently, forming the near-field light generating element 32 on such a buffer layer 33 allows the resulting near-field light generating element 32 to have a desired point angle θ and a small point radius R.

Figure 18:
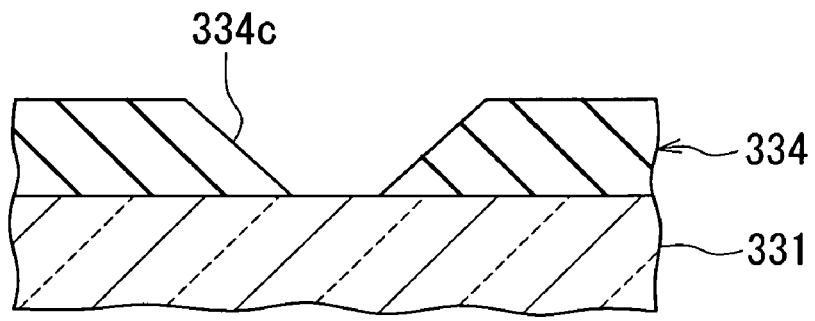
FIG. 18 is an explanatory diagram showing a step of a method of manufacturing a near-field light generating device of a comparative example.
Figure 19:
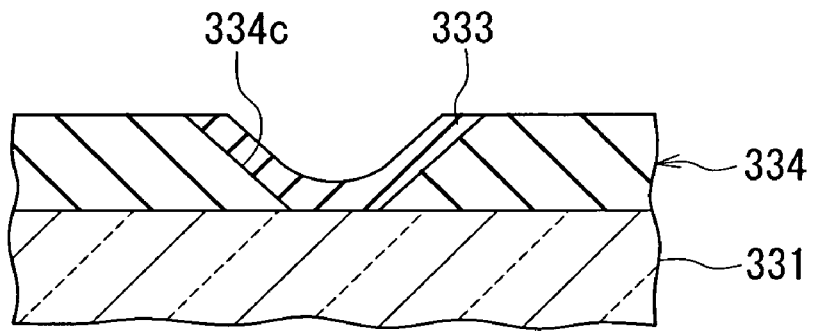
FIG. 19 is an explanatory diagram showing a step that follows the step of FIG. 18.
Figure 20:
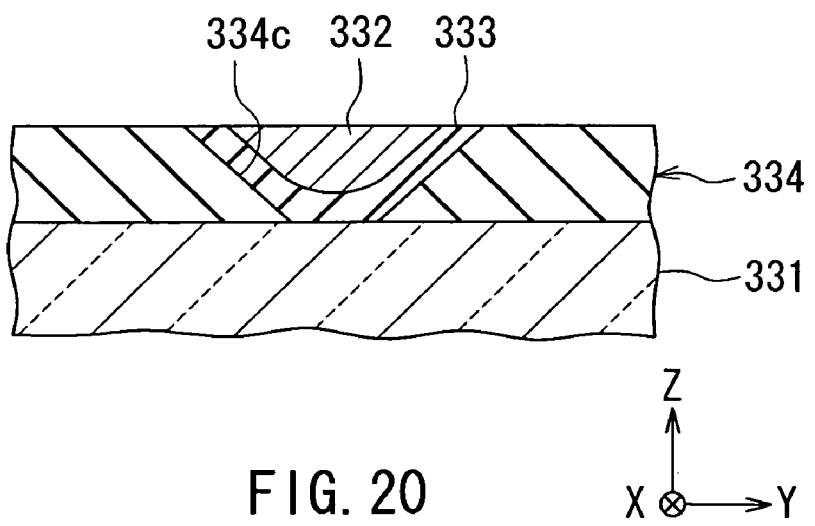
FIG. 20 is an explanatory diagram showing a step that follows the step of FIG. 19.

Reference is now made to FIG. 18 to FIG. 20 to describe a near-field light generating device of a comparative example and its manufacturing method. FIG. 18 to FIG. 20 each show a cross section of part of a stack of layers formed in the process of manufacturing the near-field light generating device of the comparative example.

In the manufacturing method of the comparative example, first, a clad layer 334 having an opening 334c is formed on a waveguide 331 as shown in FIG. 18. The opening 334c has the same shape as the opening 34c of the present embodiment. The waveguide 331 of the comparative example has no groove. Next, as shown in FIG. 19, a buffer layer 333 is formed in the opening 334c, so that the clad layer 334 and the buffer layer 333 constitute a frame for forming a near-field light generating element. Next, as shown in FIG. 20, the near-field light generating element 332 is formed in the frame. Next, the clad layer 334, the buffer layer 333 and the near-field light generating element 332 are flattened at the top.

The manufacturing method of the comparative example fails to provide the effect that has been described with reference to FIG. 17 since the waveguide 331 has no groove. As viewed in a cross section parallel to the medium facing surface, the recess formed by the top surface of the buffer layer 333 is thus shaped such that an isosceles triangle is rounded in the vicinity of its vertex into an arc shape having a large radius of curvature. Consequently, the near-field light generating element 332 formed on the buffer layer 333 has an edge part of greater point radius as compared with that of the near-field light generating element 32 according to the present embodiment.

Next, a description will be given of a first simulation performed to study the relationship between the point angle θ of the near-field light generating element 32 and the light use efficiency of the near-field light generating device 15. Here, the light use efficiency will be defined as $I_{OUT}/I_{IN}$ in percentage. $I_{IN}$ is the intensity of laser light that is incident on the waveguide 31. $I_{OUT}$ is the intensity of near-field light that occurs from the near-field light generating part 32g of the near-field light generating element 32.

Figure 21:
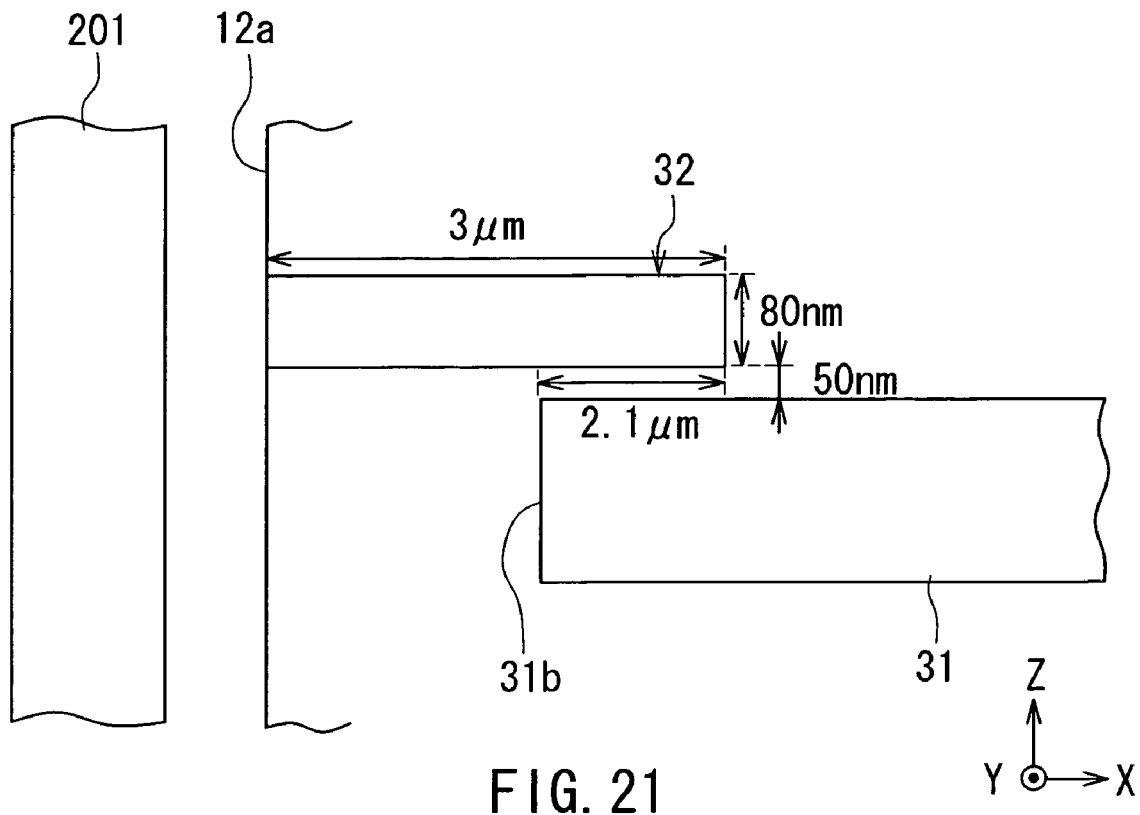
FIG. 21 is a side view of a model of the near-field light generating device used in a first simulation.
Figure 22:
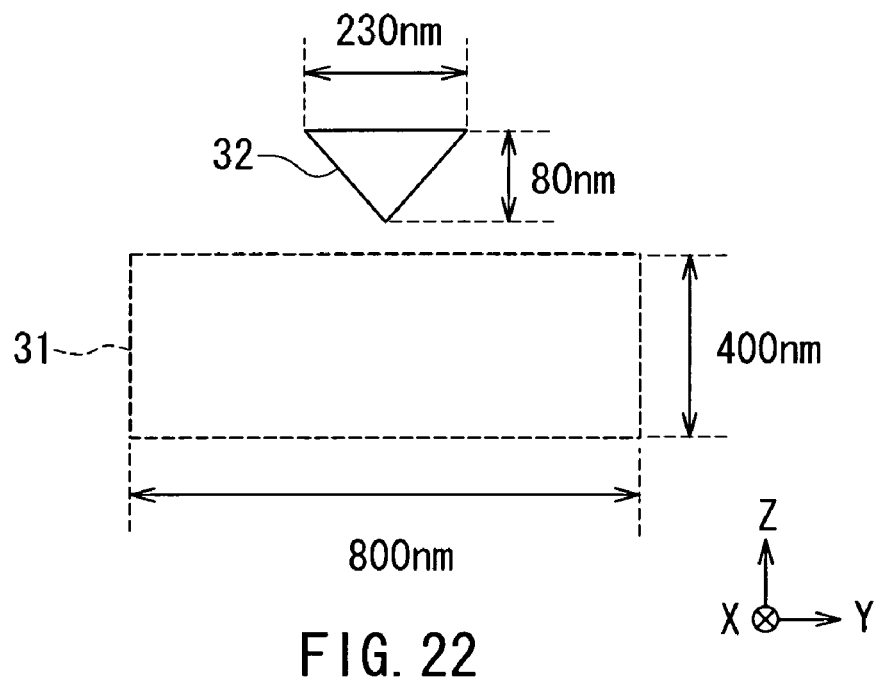
FIG. 22 is a front view of the model of the near-field light generating device shown in FIG. 21.

The conditions of the first simulation will now be described with reference to FIG. 21 and FIG. 22. FIG. 21 is a side view of a model of the near-field light generating device 15 used in the first simulation. FIG. 22 is a front view of the model of the near-field light generating device 15 shown in FIG. 21. For this model, the length of the near-field light generating element 32 in the direction perpendicular to the medium facing surface 12a (the X direction) was set to 3 µm; the maximum width $W_{NF}$ of the near-field light generating element 32 in the track width direction (the Y direction) was set to 230 nm; and the thickness (dimension in the Z direction) $T_{NF}$ of the near-field light generating element 32 was set to 80 nm. The width of the waveguide 31 in the Y direction was set to 800 nm, and the thickness (dimension in the Z direction) of the waveguide 31 was set to 400 nm. The portion of the edge part 32f of the near-field light generating element 32 opposed to the waveguide 31 with the buffer layer 33 therebetween was made to be 2.1 μm long in the direction perpendicular to the medium facing surface 12a (the X direction). The distance between the edge part 32f and the waveguide 31 was set to 50 nm. In this model, the waveguide 31 does not have the groove 31g. Tantalum oxide was selected as the material of the waveguide 31, Ag was selected as the material of the near-field light generating element 32, and $Al_2O_3$ was selected as the material of the buffer layer 33 and the clad layer 34. The wavelength of the laser light to propagate through the waveguide 31 was set to 650 nm.

In the first simulation, with the point radius R fixed at 10 nm, the light use efficiency was determined for situations where the point angle θ was 70°, 90°, 110°, 130°, and 150°, respectively. The relationship between the point angle θ and the light use efficiency obtained by this simulation is shown in the following Table 1 and FIG. 23.

TABLE 1

| θ (deg) | Light use efficiency (%) |
|---|---|
| 70 | 6.5 |
| 90 | 18.7 |
| 110 | 23.7 |
| 130 | 21.6 |
| 150 | 11.6 |

Figure 23:
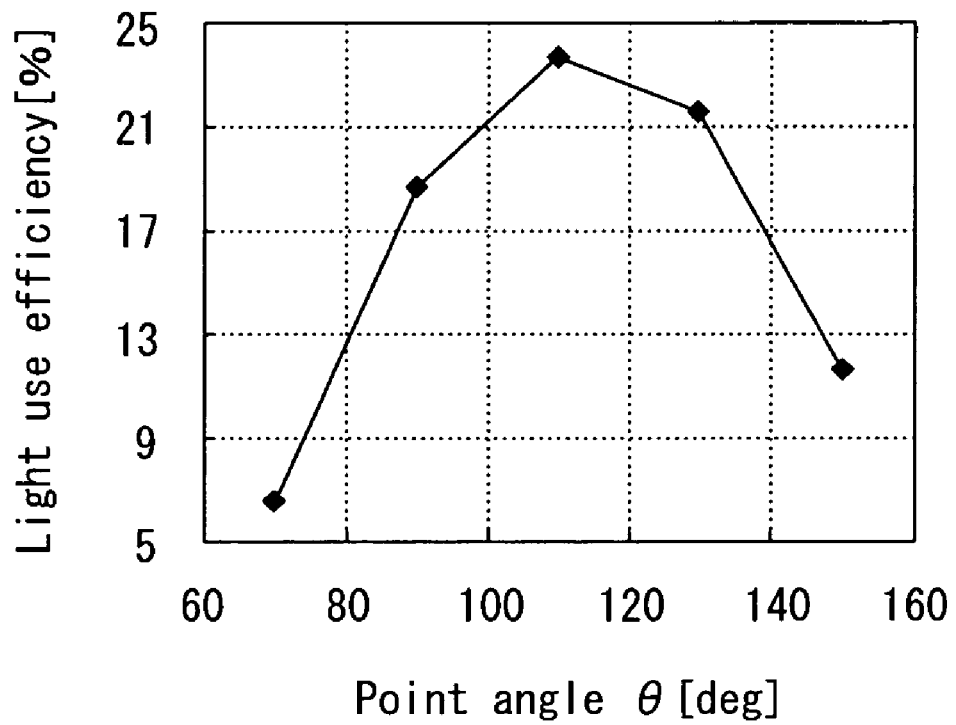
FIG. 23 is a characteristic chart showing the results of the first simulation.

From the results of the first simulation shown in Table 1 and FIG. 23, it can be seen that the light use efficiency peaks at a point angle θ of 110° under the aforementioned conditions of the first simulation. The reason why the light use efficiency varies according to the point angle θ is that the wave number of the surface plasmons excited on the near-field light generating element 32 varies according to the point angle θ. If the point angle θ is somewhat large such as 110°, it is difficult to form the edge part 32f with a small point radius R unless the manufacturing method for the near-field light generating device 15 according to the present embodiment is used.

Figure 24:
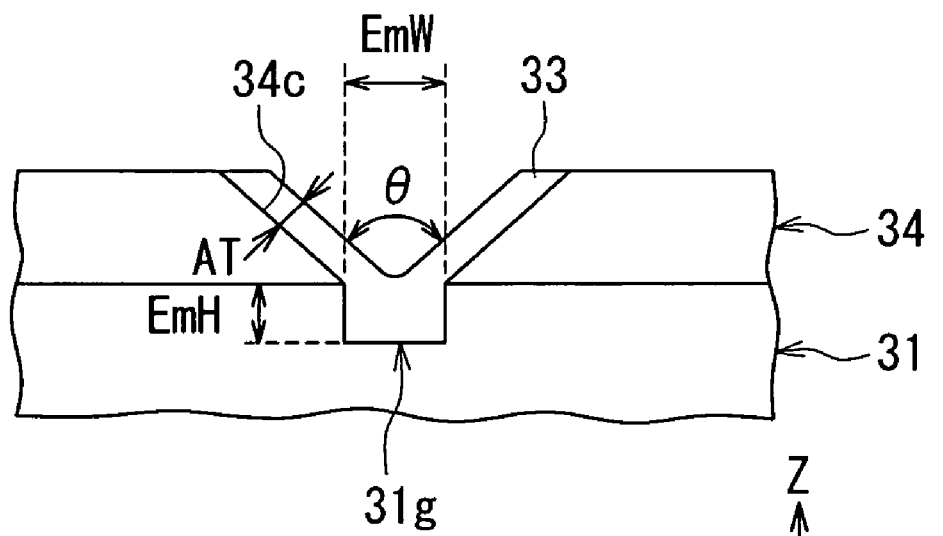
FIG. 24 is an explanatory diagram showing the shape of a model of a frame for forming a near-field light generating element used in a second simulation.

Next, a description will be given of a second simulation performed to study the relationship of the shape of the groove 31g of the waveguide 31 and the thickness AT of the buffer layer 33 with the point radius R. FIG. 24 is an explanatory diagram showing the shape of a model of the frame for forming a near-field light generating device used in the second simulation. In the second simulation, with the point angle θ fixed at 110°, the point radius R was determined for six models with different combinations of values of the depth EmH of the groove 31g, the opening width EmW of the groove 31g and the thickness AT of the buffer layer 33. The following Table 2 shows the results. Note that model 1 is without the groove 31g. For model 1, EmW indicates the width of the bottom of the opening 34c of the clad layer 34. The method of manufacturing a near-field light generating device using model 1 corresponds to the method of manufacturing a near-field light generating device of the comparative example shown in FIG. 18 to FIG. 20.

TABLE 2

| | AT (nm) | EmH (nm) | EmW (nm) | R (nm) |
|---|---|---|---|---|
| Model 1 | 100 | 0 | 220 | 50 |
| Model 2 | 100 | 50 | 270 | 30 |
| Model 3 | 100 | 80 | 230 | 20 |
| Model 4 | 100 | 70 | 150 | 10 |
| Model 5 | 50 | 40 | 120 | 20 |
| Model 6 | 50 | 50 | 100 | 10 |

From the results of the second simulation shown in Table 2, it can be seen that the near-field light generating device according to the present embodiment provides a smaller point radius R as compared to the case with the method of manufacturing a near-field light generating device of the comparative example shown in FIG. 18 to FIG. 20. The results of the second simulation also show that the point radius R is changeable by altering the shape of the groove 31g and the thickness AT of the buffer layer 33. In the second simulation, it was confirmed that surface plasmons were excited on the near-field light generating elements 32 in all the models listed in Table 2.

Next, a description will be given of a third simulation performed to study the relationship between the point radius R of the near-field light generating element 32 and the spot diameter of the near-field light that occurs from the near-field light generating part 32g of the near-field light generating element 32. In the third simulation, with Ag selected as the material of the near-field light generating element 32 and the point angle θ fixed at 110°, the near-field light occurring from the near-field light generating part 32g was determined for the spot diameter at the medium facing surface 12a for situations where the point radius R was 50 nm, 10 nm, 20 nm, and 30 nm, respectively. The spot diameter was defined as the full width at half maximum in the intensity distribution of the near-field light. The following Table 3 shows the results of the third simulation.

TABLE 3

| R (nm) | Spot diameter (nm) |
|---|---|
| 50 | 123 |
| 10 | 28 |
| 20 | 46 |
| 30 | 67 |

As shown in Table 3, it can be seen that the smaller the point radius R, the smaller the spot diameter. The value of point radius R of 5.0 nm in Table 3 is the value of point radius of the near-field light generating element that was formed by using model 1 of the second simulation which had no groove 31g. The spot diameter of 123 nm obtained for the point radius R of 50 nm is too large to achieve a high recording density. The values of point radius R of 10 nm, 20 nm and 30 nm in Table 3 are the values that are achieved by using models 2 to 6 of the second simulation which had the groove 31g, as shown in Table 2. The spot diameters obtained for the point radii R of 10 nm, 20 nm and 30 nm, respectively, are sufficiently smaller than the spot diameter obtained for the point radius R of 50 nm, and are thus suited for achieving a high recording density.

As can be seen from the foregoing first to third simulations, the present embodiment provides the near-field light generating element 32 that has a small point radius R and a desired point angle θ (for example, 110°) for improved light use efficiency. The present embodiment thus makes it possible to increase the use efficiency of the light propagating through the waveguide 31 and to reduce the spot diameter of the near-field light. Consequently, according to the present embodiment, it is possible to provide a heat-assisted magnetic recording head suited for achieving a high recording density.

Figure 25:
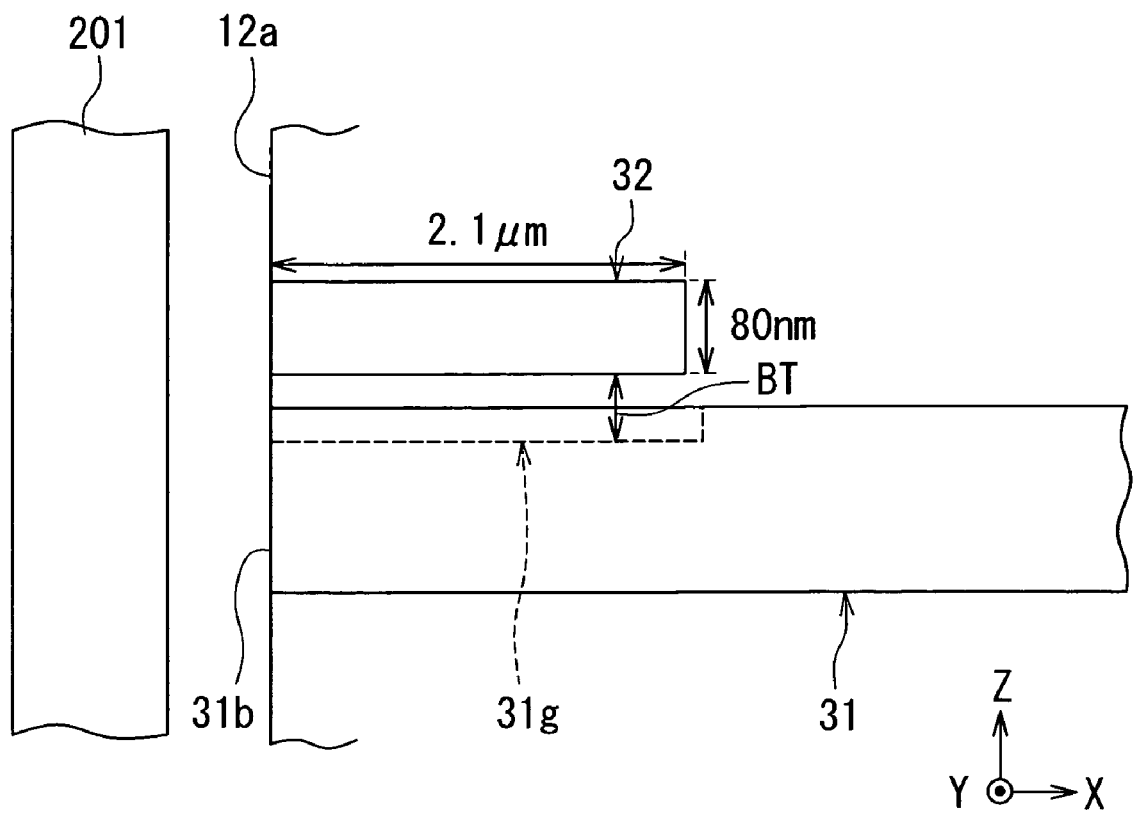
FIG. 25 is a side view of a model of the near-field light generating device used in a fourth simulation.
Figure 26:
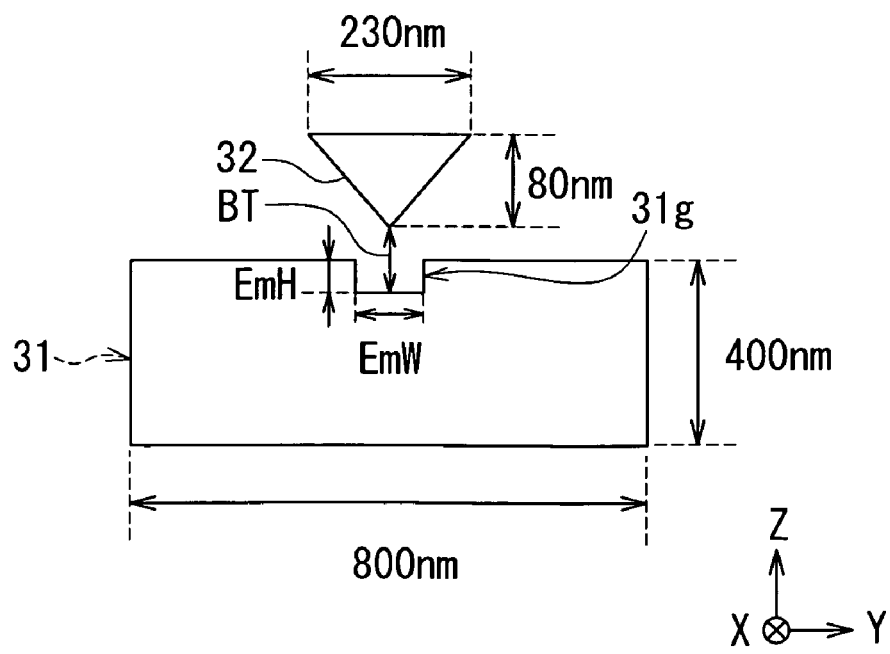
FIG. 26 is a front view of the model of the near-field light generating device shown in FIG. 25.

Next, a description will be given of a fourth simulation performed to study the relationship of the depth EmH of the groove 31g, the opening width EmW of the groove 31g and the distance BT between the bottom 31g3 of the groove 31g and the edge part 32f with the light use efficiency. Initially, the conditions of the fourth simulation will be described with reference to FIG. 25 and FIG. 26. FIG. 25 is a side view showing a model of the near-field light generating device 15 used in the fourth simulation. FIG. 26 is a front view of the model of the near-field light generating device 15 shown in FIG. 25. For this model, the length of the near-field light generating element 32 in the direction perpendicular to the medium facing surface 12a (the X direction) was set to 2.1 μm, the maximum width $W_{NF}$ of the near-field light generating element 32 in the track width direction (the Y direction) was set to 230 nm, and the thickness (dimension in the Z direction) $T_{NF}$ of the near-field light generating element 32 was set to 80 nm. The width of the waveguide 31 in the Y direction was set to 800 nm, and the thickness (dimension in the Z direction) of the waveguide 31 was set to 400 nm. In this model, the end face 31b of the waveguide 31 is located in the medium facing surface 12a. Therefore, the length BL of the coupling part 32f1 is equal to the length of the near-field light generating element 32 in the direction perpendicular to the medium facing surface 12a (the X direction), i.e., 2.1 μm. Tantalum oxide was selected as the material of the waveguide 31, Ag was selected as the material of the near-field light generating element 32, and $Al_2O_3$ was selected as the material of the buffer layer 33 and the clad layer 34. The wavelength of the laser light to propagate through the waveguide 31 was set to 650 nm.

In the fourth simulation, with the near-field light generating element 32 shaped into an isosceles triangle as viewed in a cross section parallel to the medium facing surface 12a and the point angle θ fixed at 110°, the light use efficiency (%) was determined for nine models with different combinations of EmH, EmW and BT values. The following Table 4 shows the results. Note that the three models in which EmH=0 nm and EmW=0 nm are ones without the groove 31g. For these models, BT indicates the distance between the edge part 32f and the top surface 31c of the waveguide 31.

TABLE 4

|  |  | EmH = 0 nm EmW (nm) | EmH = 50 nm EmW (nm) | | |
|---|---|---|---|---|---|
|  |  | 0 | 75 | 100 | 125 |
| BT (nm) | 25 | 11.8% |  | 9.8% |  |
|  | 50 | 21.7% | 21.1% | 23.2% | 19.9% |
|  | 75 | 8.9% |  | 20.7% | 21.3% |

As shown in Table 4, in the case without the groove 31g (EmH=0 nm and EmW=0 nm), the light use efficiency is highest when BT=50 nm, and drops sharply when BT=25 nm and when BT=75 nm. This means that controlling BT is important in stabilizing the light use efficiency in the case without the groove 31g.

In the case where the groove 31g is present, on the other hand, the light use efficiency is highest when EmH=50 nm, EmW=100 nm and BT=50 nm; however, the light use efficiency is sufficiently high even when EmH=50 nm, EmW=100 nm and BT=75 nm.

As seen above, in the absence of the groove 31g, the light use efficiency drops sharply when BT becomes greater as compared with the condition that maximizes the light use efficiency, whereas in the presence of the groove 31g, the light use efficiency will not drop sharply even if BT becomes greater as compared with the condition that maximizes the light use efficiency. A possible reason why the presence or absence of the groove 31g causes such a difference is as follows.

In the absence of the groove 31g, the top surface 31c of waveguide 31 has only an extremely narrow area that lies in the vicinity of the outer surface of the near-field light generating element 32 (edge part 320 to contribute to the excitation of surface plasmons on the near-field light generating element 32. In such a case, a change in BT leads directly to a change in distance between the area of the outer surface of the near-field light generating element 32 and the area of the top surface 31c of the waveguide 31 that lie in the vicinity of each other. For this reason, presumably, in the absence of the groove 31g the light use efficiency changes sensitively in response to a change in BT.

In the presence of the groove 31g, on the other hand, a relatively large area of the outer surface of the near-field light generating element 32 including the edge part 32f and its vicinity and a relatively large area of the outer surface of the waveguide 31 including the groove 31g and a part of the top surface 31c nearby lie in the vicinity of each other, and these areas can contribute to the excitation of surface plasmons on the near-field light generating element 32. Furthermore, even if BT changes, the distance between the outer surface of the near-field light generating element 32 and a part of the outer surface of the waveguide 31 that is located near the opening of the groove 31g, in particular, changes by a smaller amount as compared with the amount of change in BT. For these reasons, presumably, in the presence of the groove 31g the light use efficiency changes gently in response to a change in BT.

As describe above, the near-field light generating device 15 according to the present embodiment provides high light use efficiency across a wider range of BT as compared with the case without the groove 31g. Consequently, the present embodiment provides the advantages that the buffer layer 33 can be increased in thickness and that a wider range of thickness variation is allowed for the buffer layer 33. The present embodiment thereby facilitates the manufacture of the near-field light generating device 15.

As has been described, the near-field light generating device 15 according to the present embodiment makes it possible to convert the laser light propagating through the waveguide 31 into near-field light with high light use efficiency. Consequently, according to the present embodiment, it is possible to prevent a part of the medium facing surface 12a from protruding due to conversion of the energy of the laser light into thermal energy in a heat-assisted magnetic recording head.

According to the present embodiment, it is possible to achieve the near-field light generating element 32 that has a small point radius R and a desired point angle θ for increasing the light use efficiency. The present embodiment thus makes it possible to increase the use efficiency of the light propagating through the waveguide 31 and to reduce the spot diameter of the near-field light. Consequently, according to the present embodiment, it is possible to provide a heat-assisted magnetic recording head that is suited for achieving a high recording density.

Furthermore, the present embodiment allows the buffer layer 33 to be increased in thickness and allows a wider acceptable range of thickness variation of the buffer layer 33, thereby facilitating the manufacture of the near-field light generating device 15.

In the method of manufacturing the near-field light generating device 15 according to the present embodiment, the step of forming the waveguide 31 and the clad layer 34 includes the steps of: forming the preliminary waveguide 31P that is intended to make the waveguide 31 by undergoing formation of the groove 31g therein afterward; forming the clad layer 34 on the preliminary waveguide 31P; and completing the waveguide 31 by forming the groove 31g in the preliminary waveguide 31 by etching the preliminary waveguide 31P with the clad layer 34 used as the etching mask. The present embodiment thus allows precise alignment between the groove 31g and the opening 34c, thereby making it possible to form the near-field light generating element 32 with high precision.

The present invention is not limited to the foregoing embodiment but can be carried out in various modifications. For example, in the foregoing embodiment the end face of the magnetic pole 42 (the end face of the first layer 42A) is located in the medium facing surface 12a at a position forward of the end face 32b of the near-field light generating element 32 along the Z direction (in other words, located closer to the trailing end). However, the end face of the magnetic pole 42 may be located backward of the end face 32b of the near-field light generating element 32 along the Z direction (in other words, located closer to the leading end) in the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A near-field light generating device comprising:
   a waveguide that allows light to propagate therethrough and has a top surface and a groove, the groove opening in the top surface and extending in a first direction parallel to the top surface;
   a clad layer having a bottom surface in contact with the top surface of the waveguide, a top surface opposite to the bottom surface, and an opening that penetrates from the top surface to the bottom surface and is contiguous to the groove;
   a near-field light generating element that extends in the first direction, at least part of the near-field light generating element being accommodated in the opening; and
   a buffer layer that is interposed between the near-field light generating element and each of the waveguide and the clad layer in the groove and the opening, wherein:
   each of the clad layer and the buffer layer has a refractive index lower than that of the waveguide;
   the opening has a first opening sidewall and a second opening sidewall that decrease in distance from each other toward the top surface of the waveguide;
   the groove has a first groove sidewall that is contiguous to the first opening sidewall, and a second groove sidewall that is contiguous to the second opening sidewall;
   an angle that the first groove sidewall forms with respect to a second direction perpendicular to the top surface of the waveguide is smaller than an angle that the first opening sidewall forms with respect to the second direction;
   an angle that the second groove sidewall forms with respect to the second direction is smaller than an angle that the second opening sidewall forms with respect to the second direction;
   the near-field light generating element includes: a first side surface and a second side surface that are respectively opposed to the first and second opening sidewalls with the buffer layer therebetween, and decrease in distance from each other toward the groove; an edge part that connects the first and second side surfaces to each other and is opposed to the groove with the buffer layer therebetween; and a near-field light generating part that lies at one end of the edge part and generates near-field light;
   the light propagating through the waveguide is totally reflected at an interface between the waveguide and the buffer layer, and evanescent light thereby occurs from the interface; and
   a surface plasmon is excited on the edge part through coupling with the evanescent light, the surface plasmon propagates along the edge part to the near-field light generating part, and the near-field light generating part generates the near-field light based on the surface plasmon.

2. The near-field light generating device according to claim 1, wherein the near-field light generating element is made of one element selected from the group consisting of Pd, Pt, Rh, Ir, Ru, Au, Ag, Cu and Al, or an alloy composed of a plurality of elements selected from this group.

3. A method of manufacturing a near-field light generating device, the near-field light generating device comprising:
   a waveguide that allows light to propagate therethrough and has a top surface and a groove, the groove opening in the top surface and extending in a first direction parallel to the top surface;
   a clad layer having a bottom surface in contact with the top surface of the waveguide, a top surface opposite to the bottom surface, and an opening that penetrates from the top surface to the bottom surface and is contiguous to the groove;
   a near-field light generating element that extends in the first direction, at least part of the near-field light generating element being accommodated in the opening; and
   a buffer layer that is interposed between the near-field light generating element and each of the waveguide and the clad layer in the groove and the opening, wherein:
   each of the clad layer and the buffer layer has a refractive index lower than that of the waveguide;
   the opening has a first opening sidewall and a second opening sidewall that decrease in distance from each other toward the top surface of the waveguide;
   the groove has a first groove sidewall that is contiguous to the first opening sidewall, and a second groove sidewall that is contiguous to the second opening sidewall;
   an angle that the first groove sidewall forms with respect to a second direction perpendicular to the top surface of the waveguide is smaller than an angle that the first opening sidewall forms with respect to the second direction;
   an angle that the second groove sidewall forms with respect to the second direction is smaller than an angle that the second opening sidewall forms with respect to the second direction;
   the near-field light generating element includes: a first side surface and a second side surface that are respectively opposed to the first and second opening sidewalls with the buffer layer therebetween, and decrease in distance from each other toward the groove; an edge part that connects the first and second side surfaces to each other and is opposed to the groove with the buffer layer therebetween; and a near-field light generating part that lies at one end of the edge part and generates near-field light;

the light propagating through the waveguide is totally reflected at an interface between the waveguide and the buffer layer, and evanescent light thereby occurs from the interface; and a surface plasmon is excited on the edge part through coupling with the evanescent light, the surface plasmon propagates along the edge part to the near-field light generating part, and the near-field light generating part generates the near-field light based on the surface plasmon, the method comprising the steps of:

forming the waveguide and the clad layer;

forming the buffer layer in the groove of the waveguide and the opening of the clad layer so that the waveguide, the clad layer and the buffer layer constitute a frame for forming the near-field light generating element; and forming the near-field light generating element in the frame.

4. The method of manufacturing a near-field light generating device according to claim 3, wherein the step of forming the waveguide and the clad layer includes the steps of:

forming a preliminary waveguide that is intended to make the waveguide by undergoing formation of the groove therein afterward;

forming the clad layer on the preliminary waveguide; and completing the waveguide by forming the groove in the preliminary waveguide by etching the preliminary waveguide with the clad layer used as an etching mask.

5. The method of manufacturing a near-field light generating device according to claim 4, wherein, in the step of completing the waveguide, the preliminary waveguide is etched under a condition that etching selectivity is higher than 1.

6. The method of manufacturing a near-field light generating device according to claim 3, wherein the buffer layer is formed by atomic layer deposition.

7. A heat-assisted magnetic recording head comprising:

a medium facing surface that faces a magnetic recording medium;

a magnetic pole that has an end face located in the medium facing surface and produces a recording magnetic field for recording data on the magnetic recording medium; and the near-field light generating device according to claim 1, wherein:

the near-field light generating part is located in the medium facing surface; and the near-field light generating device generates near-field light that is to be applied to the magnetic recording medium when data is recorded on the magnetic recording medium using the recording magnetic field.

8. The heat-assisted magnetic recording head according to claim 7, wherein the near-field light generating element is made of one element selected from the group consisting of Pd, Pt, Rh, Ir, Ru, Au, Ag, Cu and Al, or an alloy composed of a plurality of elements selected from this group.

9. A head gimbal assembly comprising:

the heat-assisted magnetic recording head according to claim 7; and a suspension that supports the heat-assisted magnetic recording head.

10. A magnetic recording device comprising:

a magnetic recording medium;

the heat-assisted magnetic recording head according to claim 7; and a positioning device that supports the heat-assisted magnetic recording head and positions the heat-assisted magnetic recording head with respect to the magnetic recording medium.

* * * * *